US009376618B2

(12) United States Patent
Ogawa et al.

(10) Patent No.: US 9,376,618 B2
(45) Date of Patent: Jun. 28, 2016

(54) LIQUID CRYSTAL DISPLAY DEVICE

(71) Applicant: DIC CORPORATION, Tokyo (JP)

(72) Inventors: Shinji Ogawa, Kita-adachi-gun (JP);
Yoshinori Iwashita, Kita-adachi-gun (JP); Makoto Negishi, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/405,353

(22) PCT Filed: Oct. 2, 2013

(86) PCT No.: PCT/JP2013/076805
§ 371 (c)(1),
(2) Date: Dec. 3, 2014

(87) PCT Pub. No.: WO2014/188612
PCT Pub. Date: Nov. 27, 2014

(65) Prior Publication Data
US 2015/0197691 A1    Jul. 16, 2015

(30) Foreign Application Priority Data
May 22, 2013    (JP) ................................. 2013-107929

(51) Int. Cl.
*G02F 1/1343* (2006.01)
*C09K 19/12* (2006.01)
(Continued)

(52) U.S. Cl.
CPC ............. *C09K 19/12* (2013.01); *C09K 19/3003* (2013.01); *C09K 19/42* (2013.01);
(Continued)

(58) Field of Classification Search
CPC ............ G02F 1/1333; G02F 1/134336; G02F 1/136286; G02F 2001/134372; C09K 19/12; C09K 2019/3004; C09K 2019/3009; C09K 2019/301; C09K 2019/3016; C09K 2019/3027; C09K 2019/122; C09K 2019/123
See application file for complete search history.

(56) References Cited

U.S. PATENT DOCUMENTS

| 6,497,828 B1 | 12/2002 | Hirschmann et al. |
| 2001/0010576 A1 | 8/2001 | Lee et al. |

(Continued)

FOREIGN PATENT DOCUMENTS

| CN | 101276106 A | 10/2008 |
| CN | 103476905 A | 12/2013 |

(Continued)

OTHER PUBLICATIONS

International Search Report dated Dec. 10, 2013 issued in corresponding application No. PCT/JP2013/076805.
(Continued)

*Primary Examiner* — Shean C Wu
(74) *Attorney, Agent, or Firm* — Westerman, Hattori, Daniels & Adrian, LLP

(57) ABSTRACT

The present invention provides an FFS mode liquid crystal display device that uses a liquid crystal composition which has a negative dielectric anisotropy and can achieve good display properties by being used for FFS mode liquid crystal display devices without degrading the image sticking property of display devices and various properties of liquid crystal display devices, such as dielectric anisotropy, viscosity, nematic phase upper limit temperature, low-temperature nematic phase stability, and γ1. The liquid crystal composition contains at least one compound selected from the group of compounds represented by general formula (I) below and at least one compound selected from the group of compounds represented by general formula (II) below.

6 Claims, 3 Drawing Sheets

(51) Int. Cl.

| | | |
|---|---|---|
| C09K 19/30 | (2006.01) | |
| C09K 19/42 | (2006.01) | |
| C09K 19/44 | (2006.01) | |
| G02F 1/1368 | (2006.01) | |
| G02F 1/1337 | (2006.01) | |
| G02F 1/1362 | (2006.01) | |
| G02F 1/137 | (2006.01) | |

(52) U.S. Cl.
CPC .............. C09K 19/44 (2013.01); G02F 1/1337 (2013.01); G02F 1/1368 (2013.01); G02F 1/13439 (2013.01); G02F 1/134309 (2013.01); G02F 1/134336 (2013.01); G02F 1/136286 (2013.01); C09K 2019/122 (2013.01); C09K 2019/123 (2013.01); C09K 2019/301 (2013.01); C09K 2019/3004 (2013.01); C09K 2019/3027 (2013.01); G02F 2001/13712 (2013.01); G02F 2001/134372 (2013.01); G02F 2201/40 (2013.01)

(56) References Cited

U.S. PATENT DOCUMENTS

| | | |
|---|---|---|
| 2001/0048501 A1 | 12/2001 | Kim et al. |
| 2003/0117558 A1 | 6/2003 | Kim et al. |
| 2008/0239181 A1 | 10/2008 | Jin |
| 2009/0268150 A1 | 10/2009 | Hattori et al. |
| 2009/0309066 A1 | 12/2009 | Klasen-Memmer et al. |
| 2011/0116017 A1 | 5/2011 | Gere |
| 2011/0193020 A1* | 8/2011 | Klasen-Memmer ........... C09K 19/3003 252/299.61 |
| 2012/0261614 A1 | 10/2012 | Goto et al. |
| 2012/0268706 A1 | 10/2012 | Goebel et al. |
| 2012/0326084 A1* | 12/2012 | Klasen-Memmer et al. ................... 252/299.61 |
| 2013/0207039 A1 | 8/2013 | Hattori et al. |

FOREIGN PATENT DOCUMENTS

| | | |
|---|---|---|
| JP | 11-202356 A | 7/1999 |
| JP | 2002-31812 A | 1/2002 |
| JP | 2003-233083 A | 8/2003 |
| JP | 2010-503733 A | 2/2010 |
| JP | 2010-535910 A | 11/2010 |
| KR | 2012-0120992 A | 11/2012 |
| TW | 200808943 A | 2/2008 |
| TW | 200819520 A | 5/2008 |
| TW | 200918646 A | 5/2009 |
| WO | 2012/053323 A1 | 4/2012 |
| WO | 2012/144321 A1 | 10/2012 |

OTHER PUBLICATIONS

Written Opinion of the International Searching Authority dated Dec. 10, 2013 issued in corresponding application No. PCT/JP2013/076805.

Young Jin Lim et al., "High performance transflective liquid crystal display associated with fringe-field switching device" Optics Express, Apr. 25, 2011, vol. 19, No. 9, pp. 8085-8091, Korea, cited in Korean Office Action dated Dec. 22, 2014 (7 pages).

Non-Final Office Action dated Mar. 7, 2016, issued in U.S. Appl. No. 14/405,057 (14 pages).

* cited by examiner

LIQUID CRYSTAL DISPLAY DEVICE

TECHNICAL FIELD

The present invention relates to an FFS mode liquid crystal display that uses a nematic liquid crystal composition having a negative dielectric anisotropy and that has a high transmittance and a high aperture ratio.

BACKGROUND ART

Active matrix liquid crystal display devices are commercially available and used in, for example, portable terminals, liquid crystal televisions, projectors, and computers because of their high display quality. In active matrix liquid crystal display devices, a TFT (thin film transistor), a MIM (metal-insulator-metal), or the like is used in each pixel and a high voltage holding ratio is important for liquid crystal compounds or liquid crystal compositions used in active matrix liquid crystal display devices. Liquid crystal display devices obtained by combination with a VA (vertical alignment) mode, an IPS (in-plane switching) mode, or an OCB (optically compensated bend or optically compensated birefringence) mode have been proposed to achieve good visual properties. Furthermore, ECB (electrically controlled birefringence) mode reflective liquid crystal display devices have been proposed to achieve brighter display. At present, novel liquid crystal compounds or liquid crystal compositions are being proposed for such liquid crystal display devices.

A fringe field switching (FFS) mode liquid crystal display, which is one of IPS mode liquid crystal displays having high quality and good visual properties, is being widely used as a liquid crystal display for smart phones (refer to PTL 1 and PTL 2). An FFS mode has been introduced to address the low aperture ratio and low transmittance of an IPS mode. In an FFS mode, a material containing a p-type liquid crystal composition having a positive dielectric anisotropy is widely used because the voltage can be easily decreased. Since most of the application areas of the FFS mode are portable terminals, there is a high demand for lower power consumption and thus liquid crystal device manufacturers have been actively making development efforts such as adoption of an array that uses IGZO.

The transmittance can also be improved by changing a liquid crystal material from a currently used p-type material to an n-type material having a negative dielectric anisotropy (refer to PTL 3). The reason for this is as follows. In the FFS mode, a completely parallel electric field is not generated unlike the IPS mode. When a p-type material is used, the major axis of liquid crystal molecules located near a pixel electrode is inclined along the fringing field, which degrades the transmittance. In contrast, when an n-type liquid crystal composition is used, the influence of the fringing field is only on the rotation of the liquid crystal molecules about the major axis of the liquid crystal molecules because the polarization direction of the n-type liquid crystal composition is a minor-axis direction of the molecules. As a result, the parallel arrangement of the molecule major axes is maintained, and thus a decrease in the transmittance does not occur.

Although n-type liquid crystal compositions are typical liquid crystal compositions for a VA mode, the VA mode and the FFS mode are different from each other in terms of alignment direction, electric field direction, and required optical properties. Furthermore, FFS mode liquid crystal display devices have a distinctive feature in terms of electrode structure as described below. That is, both substrates include an electrode in the VA mode whereas only an array substrate includes an electrode in the FFS mode. Therefore, there is no knowledge about problems such as image sticking and drop marks, which makes it difficult to predict the improvement from the related art. Accordingly, it is difficult to provide a liquid crystal display device having the level of high performance required today by simply using a liquid crystal composition for a VA mode, and therefore an n-type liquid crystal composition optimized for an FFS mode is desired.

CITATION LIST

Patent Literature

PTL 1: Japanese Unexamined Patent Application Publication No. 11-202356
PTL 2: Japanese Unexamined Patent Application Publication No. 2003-233083
PTL 3: Japanese Unexamined Patent Application Publication No. 2002-31812

SUMMARY OF INVENTION

Technical Problem

It is an object of the present invention to provide a liquid crystal display device that uses an n-type liquid crystal composition which is excellent in terms of various properties for liquid crystal display devices, such as dielectric anisotropy ($\Delta\in$), viscosity ($\eta$), nematic phase-isotropic liquid phase transition temperature ($T_{NI}$), low-temperature nematic phase stability, and rotational viscosity ($\gamma_1$), and which can achieve good display properties by being used for FFS mode liquid crystal display devices.

Solution to Problem

The inventors of the present invention have thoroughly conducted studies to achieve the above object. As a result of studies on various liquid crystal compositions which are most suitable for FFS mode liquid crystal display devices, the inventors have found the effectiveness of a liquid crystal composition containing two liquid crystal compounds each having a distinctive structure and have completed the present invention.

The present invention provides a liquid crystal display device including a first transparent insulating substrate and a second transparent insulating substrate disposed so as to face each other; a liquid crystal layer containing a liquid crystal composition and sandwiched between the first substrate and the second substrate;

a common electrode composed of a transparent conductive material and disposed on the first substrate; a plurality of gate bus lines and a plurality of data bus lines disposed on the first substrate so as to form a matrix;

a thin film transistor disposed at each of intersections of the gate bus lines and the data bus lines; a pixel electrode composed of a transparent conductive material and driven by the transistor, the thin film transistor and the pixel electrode being included in each pixel; and alignment films that induce homogeneous alignment and are disposed between the liquid crystal layer and the first substrate and between the liquid crystal layer and the second substrate, alignment directions of the alignment films being parallel to each other, wherein an interelectrode distance R between the pixel electrode and the common electrode is smaller than a distance G between the first substrate and the second substrate so that a fringing field is formed between the pixel electrode and the common electrode, the common electrode is disposed on substantially an entire surface of the first substrate so as to be closer to the first substrate than the pixel electrode, and the liquid crystal composition has a negative dielectric anisotropy, a nematic phase-isotropic liquid phase transition temperature of 60° C. or higher, and an absolute value of dielectric anisotropy of 2 or more and contains at least one compound selected from the group of compounds represented by general formula (I) below,

[Chem. 1]

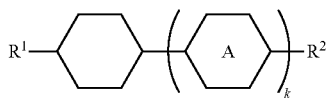
(I)

(in the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; A represents a 1,4-phenylene group or a trans-1,4-cyclohexylene group; k represents 1 or 2; and when k represents 2, two A may be the same or different) and at least one compound selected from the group of compounds represented by general formula (II) below,

[Chem. 2]

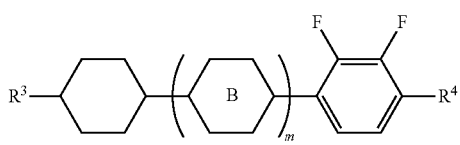
(II)

(in the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; B represents a 1,4-phenylene group or a trans-1,4-cyclohexylene group; m represents 0, 1, or 2; and when m represents 2, two B may be the same or different).

Advantageous Effects of Invention

The FFS mode liquid crystal display device according to the present invention has high-speed response, hardly causes display defects, and exhibits good display properties. The liquid crystal display device according to the present invention is useful for display devices such as liquid crystal TVs and monitors.

DESCRIPTION OF EMBODIMENTS

Figure 1:
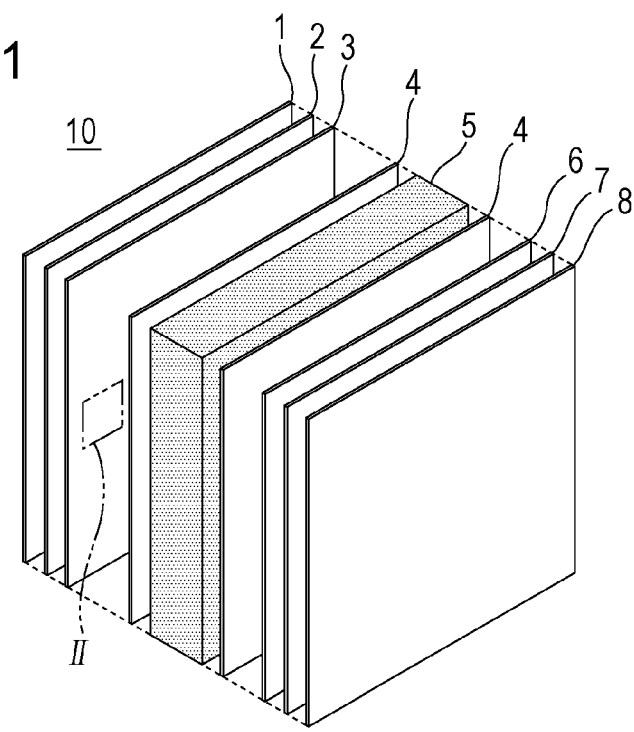
FIG. 1 schematically shows an example of a structure of a liquid crystal display device of the present invention.

As described above, the present invention is made by finding an n-type liquid crystal composition which is most suitable for FFS mode liquid crystal display devices. An embodiment of the liquid crystal composition according to the present invention will be described below.

(Liquid Crystal Layer)

The liquid crystal composition according to the present invention contains one or more of compounds represented by general formula (I) as first components.

[Chem. 3]

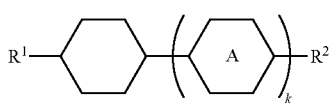
(I)

(In the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; A represents a 1,4-phenylene group or a trans-1,4-cyclohexylene group; k represents 1 or 2; and when k represents 2, two A may be the same or different.)

The lower limit of the total content of the compounds represented by the general formula (I) in the entire composition is preferably 5 mass %, more preferably 10 mass %, more preferably 15 mass %, particularly preferably 20 mass %, and most preferably 25 mass %. The upper limit of the total content is preferably 65 mass %, more preferably 55 mass %, more preferably 50 mass %, particularly preferably 47 mass %, and most preferably 45 mass %.

For example, the compounds represented by the general formula (I) are specifically compounds represented by general formula (I-a) to general formula (I-e) below.

[Chem. 4]

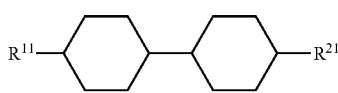
(I-a)

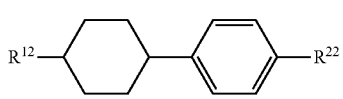
(I-b)

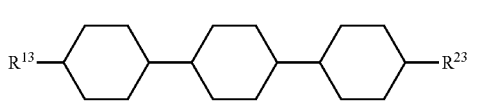
(I-c)

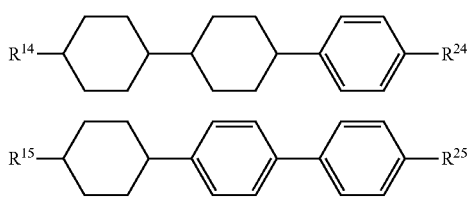

(In the formulae, $R^{11}$ to $R^{15}$ and $R^{21}$ to $R^{25}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.)

One to ten of compounds selected from the group of the compounds represented by the general formula (I-a) to the general formula (I-e) are preferably contained, one to eight of the compounds are more preferably contained, and one to five of the compounds are particularly preferably contained. Two or more of the compounds are also preferably contained.

Preferably, $R^{11}$ to $R^{15}$ and $R^{21}$ to $R^{25}$ each independently represent an alkyl group having 1 to 8 carbon atoms, an alkenyl group having 2 to 8 carbon atoms, or an alkoxy group having 2 to 8 carbon atoms. More preferably, $R^{11}$ to $R^{15}$ and $R^{21}$ to $R^{25}$ each independently represent an alkyl group having 1 to 5 carbon atoms, an alkenyl group having 2 to 5 carbon atoms, or an alkoxy group having 2 to 5 carbon atoms. When $R^{11}$ to $R^{15}$ and $R^{21}$ to $R^{25}$ represent an alkenyl group, the alkenyl group preferably has structures represented by formula (i) to formula (iv) below.

[Chem. 5]

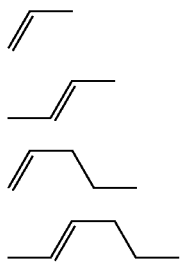

(In the formulae, the right terminal bonds to a ring structure.)

$R^{11}$ and $R^{21}$, $R^{12}$ and $R^{22}$, $R^{13}$ and $R^{23}$, $R^{14}$ and $R^{24}$, and $R^{15}$ and $R^{25}$ may be the same or different, but preferably represent different substituents.

From this viewpoint, for example, the compounds represented by the general formula (I) preferably include at least one compound selected from the group of compounds represented by general formula (III) below.

[Chem. 6]

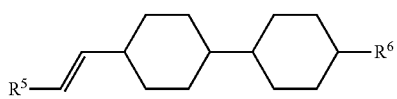

(III)

(In the formula, $R^5$ represents a hydrogen atom or a methyl group and $R^6$ represents an alkyl group having 1 to 5 carbon atoms, an alkenyl group having 2 to 5 carbon atoms, or an alkoxy group having 1 to 4 carbon atoms.)

More specifically, the compounds represented by the general formula (III) are preferably the following compounds.

[Chem. 7]

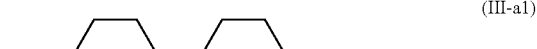
(III-a1)

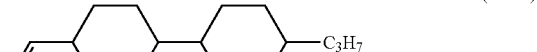
(III-a2)

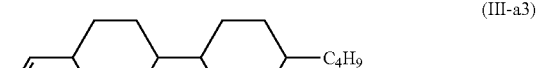
(III-a3)

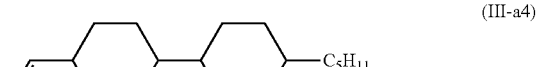
(III-a4)

[Chem. 8]

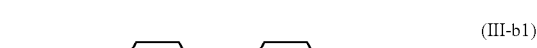
(III-b1)

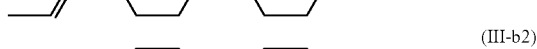
(III-b2)

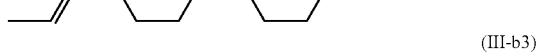
(III-b3)

(III-b4)

When the compounds represented by the general formula (III) are contained, the lower limit of the content of the compounds represented by the general formula (III) in the liquid crystal composition is preferably 5 mass %, more preferably 15 mass %, more preferably 20 mass %, particularly preferably 23 mass %, and most preferably 25 mass %. The upper limit of the content is preferably 70 mass %, more preferably 60 mass %, more preferably 55 mass %, particularly preferably 52 mass %, and most preferably 50 mass %. More specifically, when an importance is given to response speed, the lower limit is preferably 20 mass %, more preferably 30 mass %, more preferably 35 mass %, particularly preferably 38 mass %, and most preferably 35 mass %. The upper limit is preferably 70 mass %, more preferably 60 mass %, more preferably 55 mass %, particularly preferably 52 mass %, and most preferably 50 mass %. When an importance is given to drive voltage, the lower limit is preferably 5 mass %, more preferably 15 mass %, more preferably 20 mass %, particularly preferably 23 mass %, and most preferably 25 mass %. The upper limit is preferably 60 mass %, more preferably 50 mass %, more preferably 45 mass %, particularly preferably 42 mass %, and most preferably 40 mass %. The lower limit of the ratio of the content of the compounds represented by the general formula (III) to the total content of the compounds represented by the general formula (I) in the liquid crystal composition is preferably 60 mass %, more preferably 70 mass %, more preferably 75 mass %, particularly preferably 78 mass %, and most preferably 80 mass %. The upper limit of the ratio is preferably 90 mass %, more preferably 95 mass %, more preferably 97 mass %, particularly preferably 99 mass %, and preferably 100 mass %.

More specifically, the compounds represented by the general formula (I-a) to the general formula (I-e) other than the compounds represented by the general formula (III) are preferably the following compounds.

[Chem. 9]

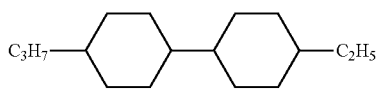
(I-a1)

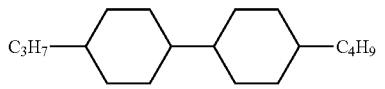
(I-a2)

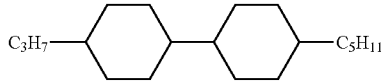
(I-a3)

[Chem. 10]

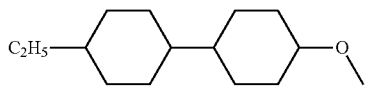
(I-a4)

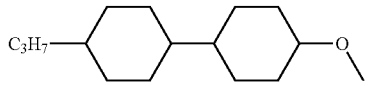
(I-a5)

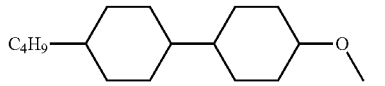
(I-a6)

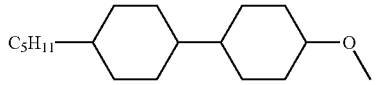
(I-a7)

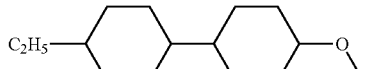
(I-a8)

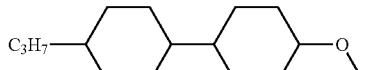
(I-a9)

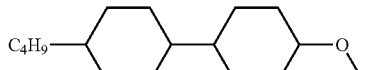
(I-a10)

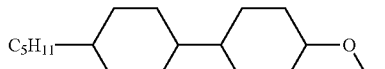
(I-a11)

[Chem. 11]

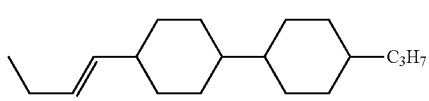
(I-a12)

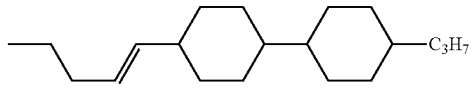
(I-a13)

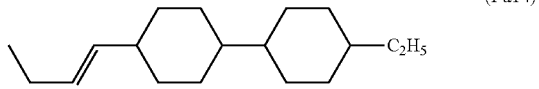
(I-a14)

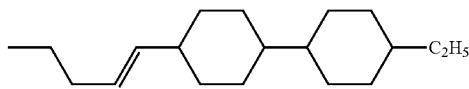
(I-a15)

[Chem. 12]

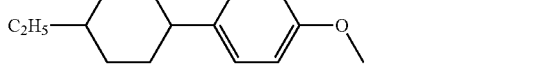
(I-b1)

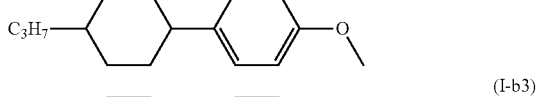
(I-b2)

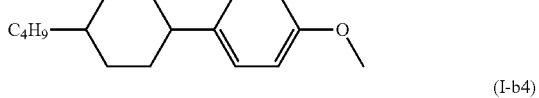
(I-b3)

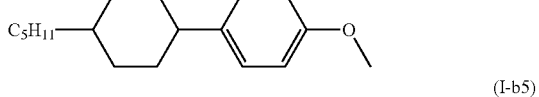
(I-b4)

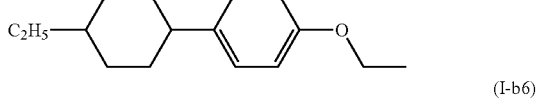
(I-b5)

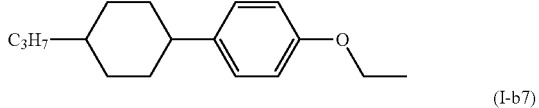
(I-b6)

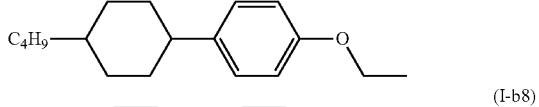
(I-b7)

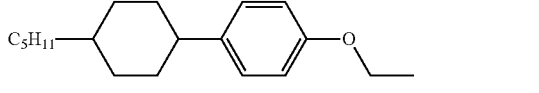
(I-b8)

[Chem. 13]

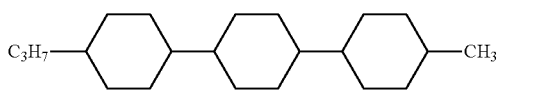
(I-c1)

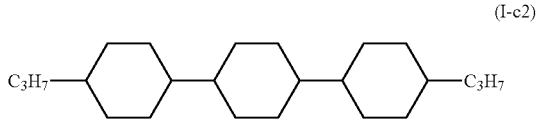
(I-c2)

[Chem. 14]

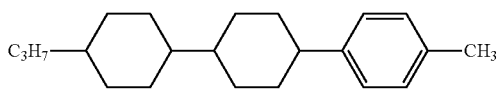
(I-d1)

-continued

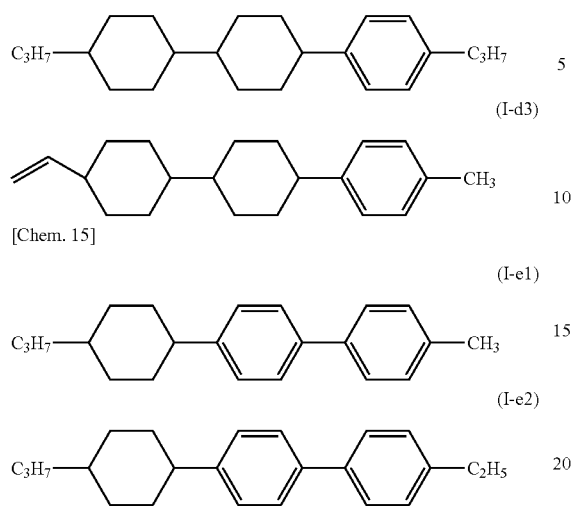

[Chem. 15]

Among them, the compounds represented by formula (III-a2), formula (III-b2), formula (I-a1) to formula (I-a6), formula (I-b2), formula (I-b6), formula (I-d1), formula (I-d2), formula (I-d3), and formula (I-e2) are preferred.

The liquid crystal composition according to the present invention contains one or more of compounds represented by general formula (II) as second components.

[Chem. 16]

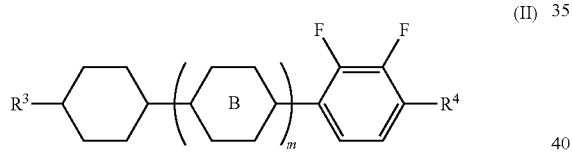

(In the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; B represents a 1,4-phenylene group or a trans-1,4-cyclohexylene group; m represents 0, 1, or 2; and when m represents 2, two B may be the same or different.)

The lower limit of the content of the compounds represented by the general formula (II) in the liquid crystal composition is preferably 10 mass %, more preferably 20 mass %, more preferably 25 mass %, particularly preferably 28 mass %, and most preferably 30 mass %. The upper limit of the content is preferably 85 mass %, more preferably 75 mass %, more preferably 70 mass %, particularly preferably 67 mass %, and most preferably 65 mass %.

The compounds represented by the general formula (II) are preferably one or more compounds selected from the group of compounds represented by general formula (IIa) to general formula (IIc) and more preferably two or more compounds selected from the group of compounds represented by general formula (IIa) to general formula (IIc).

[Chem. 17]

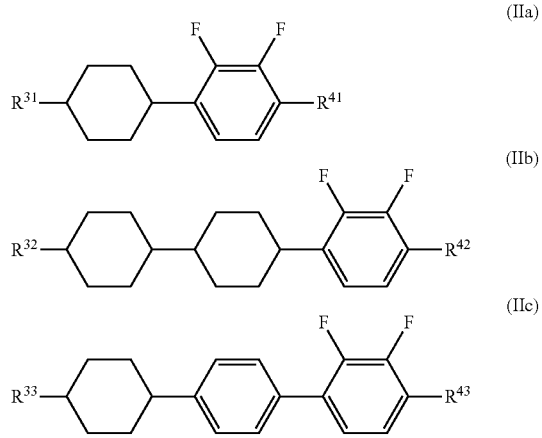

(In the formulae, $R^{31}$ to $R^{33}$ and $R^{41}$ to $R^{43}$ represent the same meaning as $R^3$ and $R^4$ in the general formula (II).)

Specifically, the compounds represented by the general formula (IIa) are preferably compounds represented by formula (IIa-1) to formula (IIa-8).

[Chem. 18]

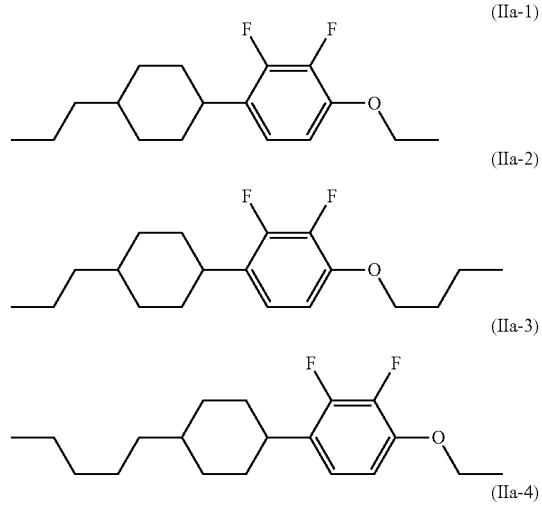

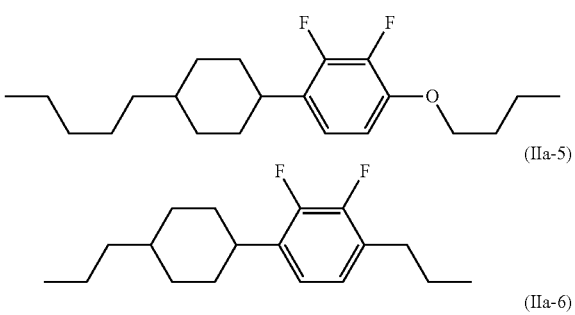

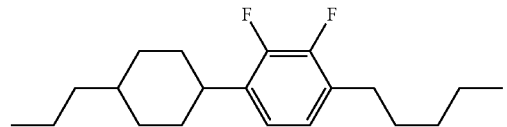

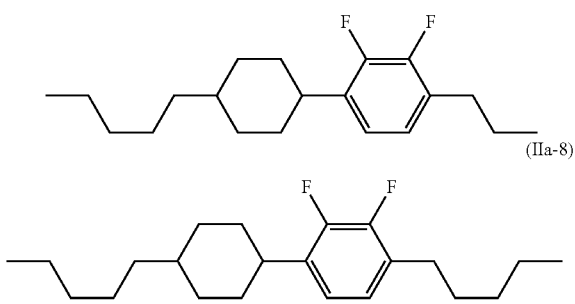

The compounds represented by the general formula (IIa) are more preferably compounds represented by formula (IIa-1) to formula (IIa-4) and further preferably compounds represented by formula (IIa-1) and formula (IIa-3).

The lower limit of the content of the compounds represented by the general formula (IIa) is preferably 2 mass % and more preferably 3 mass %, and the upper limit of the content is preferably 45 mass %, more preferably 35 mass %, more preferably 30 mass %, particularly preferably 27 mass %, and most preferably 25 mass %.

When four or more of the compounds represented by the general formula (IIa) are used, the compounds represented by the formula (IIa-1) to the formula (IIa-4) are preferably used in combination and the content of the compounds represented by the formula (IIa-1) to the formula (IIa-4) in the compounds represented by the general formula (IIa) is preferably 50 mass % or more, more preferably 70 mass % or more, and further preferably 80 mass % or more.

When three of the compounds represented by the general formula (IIa) are used, the compounds represented by the formula (IIa-1), the formula (IIa-2), and the formula (IIa-3) are preferably used in combination and the content of the compounds represented by the formula (IIa-1), the formula (IIa-2), and the formula (IIa-3) in the compounds represented by the general formula (IIa) is preferably 50 mass % or more, more preferably 70 mass % or more, more preferably 80 mass % or more, particularly preferably 85 mass % or more, and most preferably 90 mass % or more.

When two of the compounds represented by the general formula (IIa) are used, the compounds represented by the formula (IIa-1) and the formula (IIa-3) are preferably used in combination and the content of the compounds represented by the formula (IIa-1) and the formula (IIa-3) in the compounds represented by the general formula (IIa) is preferably 50 mass % or more, more preferably 70 mass % or more, more preferably 80 mass % or more, particularly preferably 85 mass % or more, and most preferably 90 mass % or more.

Specifically, the compounds represented by the general formula (IIb) are preferably compounds represented by formula (IIb-1) to formula (IIb-6) below.

[Chem. 19]

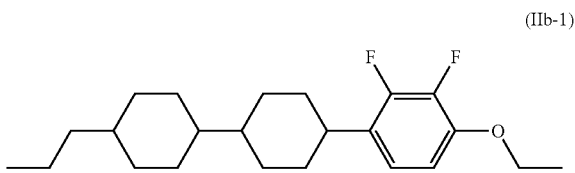

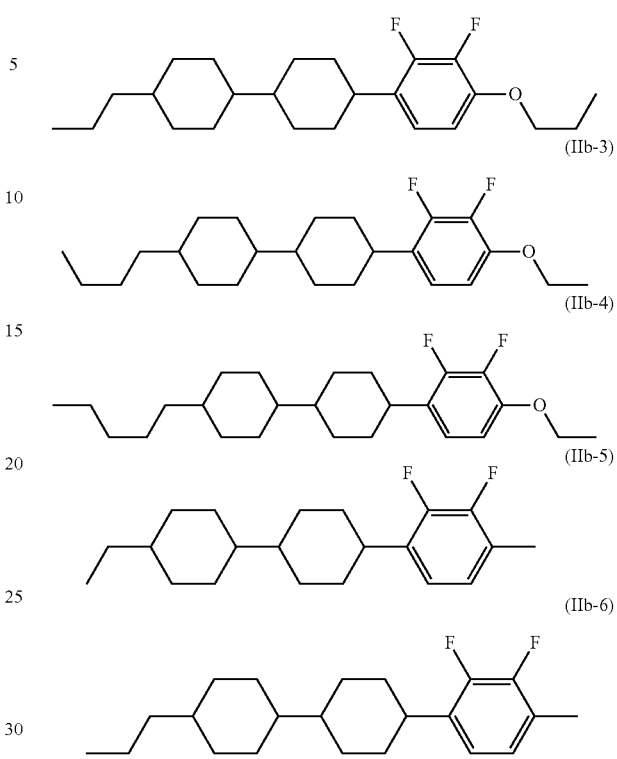

The compounds represented by the general formula (IIb) are more preferably compounds represented by formula (IIb-1) to formula (IIb-4), further preferably compounds represented by formula (IIb-1) to formula (IIb-3), and particularly preferably compounds represented by formula (IIb-1) and formula (IIb-3).

When four or more of the compounds represented by the general formula (IIb) are used, the compounds represented by the formula (IIb-1) to the formula (IIb-4) are preferably used in combination and the content of the compounds represented by the formula (IIb-1) to the formula (IIb-4) in the compounds represented by the general formula (IIb) is preferably 50 mass % or more, more preferably 70 mass % or more, more preferably 80 mass % or more, particularly preferably 85 mass % or more, and most preferably 90 mass % or more.

When three of the compounds represented by the general formula (IIb) are used, the compounds represented by the formula (IIb-1) to the formula (IIb-3) are preferably used in combination and the content of the compounds represented by the formula (IIb-1) to the formula (IIb-3) in the compounds represented by the general formula (IIb) is preferably 50 mass % or more, more preferably 70 mass % or more, more preferably 80 mass % or more, particularly preferably 85 mass % or more, and most preferably 90 mass % or more.

When two of the compounds represented by the general formula (IIb) are used, the compounds represented by the formula (IIb-1) and the formula (IIb-3) are preferably used in combination and the content of the compounds represented by the formula (IIb-1) and the formula (IIb-3) in the compounds represented by the general formula (IIb) is preferably 50 mass % or more, more preferably 70 mass % or more, more preferably 80 mass % or more, particularly preferably 85 mass % or more, and most preferably 90 mass % or more.

Specifically, the compounds represented by the general formula (IIc) are preferably compounds represented by formula (IIc-1) to formula (IIc-4).

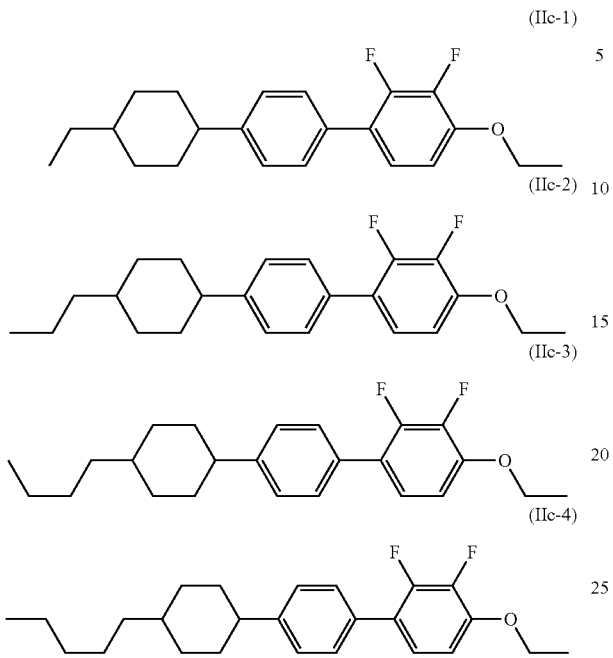

The compounds represented by the general formula (IIc) are more preferably compounds represented by formula (IIc-1) and formula (IIc-2).

When two or more of the compounds represented by the general formula (IIc) are used, the compounds represented by the formula (IIc-1) and the formula (IIc-2) are preferably used in combination and the content of the compounds represented by the formula (IIc-1) and the formula (IIc-2) in the compounds represented by the general formula (IIc) is preferably 50 mass % or more, more preferably 70 mass % or more, more preferably 80 mass % or more, particularly preferably 85 mass % or more, and most preferably 90 mass % or more.

The composition according to the present invention preferably further contains compounds represented by general formula (IV). Note that the compounds represented by the general formula (IV) exclude the compounds represented by the general formula (II).

[Chem. 21]

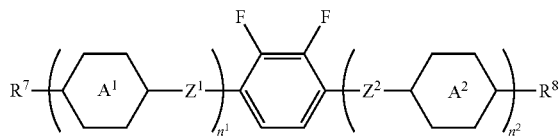

(IV)

(In the formula, $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; one or more hydrogen atoms in the alkyl group, the alkenyl group, the alkoxy group, or the alkenyloxy group may be substituted with fluorine atoms; a methylene group in the alkyl group, the alkenyl group, the alkoxy group, or the alkenyloxy group may be substituted with an oxygen atom as long as oxygen atoms do not directly bond to each other and may be substituted with a carbonyl group as long as carbonyl groups do not directly bond to each other; $A^1$ and $A^2$ each independently represent a 1,4-cyclohexylene group, a 1,4-phenylene group, or a tetrahydropyran-2,5-diyl group; when $A^1$ and/or $A^2$ represents a 1,4-phenylene group, one or more hydrogen atoms in the 1,4-phenylene group may be substituted with fluorine atoms; $Z^1$ and $Z^2$ each independently represent a single bond, $-OCH_2-$, $-OCF_2-$, $-CH_2O-$, or $CF_2O-$; $n^1$ and $n^2$ each independently represent 0, 1, 2, or 3 and $n^1+n^2$ is 1 to 3; when a plurality of $A^1$, $A^2$, $Z^1$, and/or $Z^2$ are present, $A^1$, $A^2$, $Z^1$, and/or $Z^2$ may be the same or different; and a compound in which $n^1$ represents 1 or 2, $n^2$ represents 0, at least one of $A^1$ represents a 1,4-cyclohexylene group, and all $Z^1$ are single bonds is excluded.)

The lower limit of the content of the compounds represented by the general formula (IV) in the liquid crystal composition is preferably 2 mass %, more preferably 3 mass %, more preferably 4 mass %, and particularly preferably 5 mass %. The upper limit of the content is preferably 45 mass %, more preferably 35 mass %, more preferably 30 mass %, particularly preferably 27 mass %, and most preferably 25 mass %.

In the general formula (IV), $R^7$ and $R^8$ preferably represent an alkyl group or an alkenyl group when a ring structure to which each of $R^7$ and $R^8$ bonds is cyclohexane or tetrahydropyran and preferably represent an alkyl group, an alkoxy group, or an alkenyl group when a ring structure to which each of $R^7$ and $R^8$ bonds is benzene. When the ring structure to which each of $R^7$ and $R^8$ bonds is cyclohexane or tetrahydropyran, $R^7$ and $R^8$ preferably represent an alkyl group having 1 to 8 carbon atoms or an alkenyl group having 2 to 8 carbon atoms, more preferably represent an alkyl group having 1 to 8 carbon atoms, more preferably represent an alkyl group having 3 to 5 carbon atoms, more preferably represent an alkyl group having 3 or 5 carbon atoms, and preferably represent a linear group. In the general formula (IV), when the ring structure to which each of $R^7$ and $R^8$ bonds is benzene, $R^7$ and $R^8$ preferably represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, more preferably represent an alkyl group having 1 to 8 carbon atoms or an alkoxy group having 1 to 8 carbon atoms, more preferably represent an alkyl group having 3 to 5 carbon atoms or an alkoxy group having 2 to 4 carbon atoms, more preferably represent an alkyl group having 3 or 5 carbon atoms or an alkoxy group having 2 or 4 carbon atoms, more preferably represent an alkoxy group having 2 or 4 carbon atoms, and preferably represent a linear group.

When an importance is given to an improvement in the response speed of a display device, an alkenyl group is preferred. When an importance is given to reliability such as a voltage holding ratio or the like, an alkyl group is preferred. The alkenyl group preferably has structures represented by formula (i) to formula (iv) below.

[Chem. 22]

 (i)

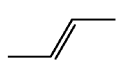 (ii)

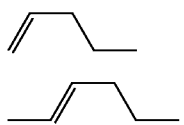

(iii)

(iv)

(In the formulae, the right terminal bonds to the ring structure.)

$A^1$ and $A^2$ preferably each independently represent a 1,4-cyclohexylene group, a 1,4-phenylene group, or a tetrahydropyran-2,5-diyl group.

When an importance is given to a decrease in viscosity, $Z^1$ and $Z^2$ preferably each independently represent a single bond. When an importance is given to an increase in the absolute value of $\Delta\in$, $Z^1$ and $Z^2$ preferably each independently represent —$OCH_2$—, —$OCF_2$—, —$CH_2O$—, or —$CF_2O$— and an oxygen atom is preferably configured so as to bond to a 2,3-difluorobenzene-1,4-diyl group.

Preferably, $n^1+n^2$ is 2 or less. When an importance is given to a decrease in viscosity, $n^1+n^2$ is preferably 1. When an importance is given to $T_{ni}$ or an increase in $\Delta n$, $n^1+n^2$ is preferably 2.

The compounds represented by the general formula (IV) are preferably selected from the group of compounds represented by general formulae (IVa1) and (IVa2) below.

[Chem. 23]

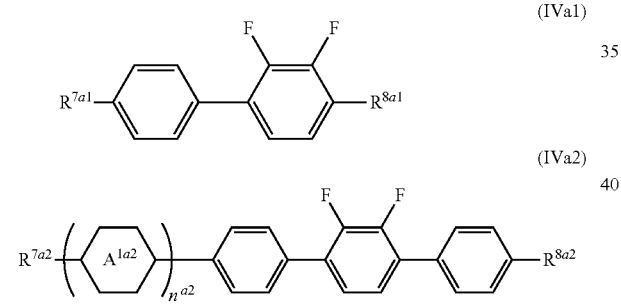

(IVa1)

(IVa2)

(In the formulae, $R^{7a1}$, $R^{7a2}$, $R^{8a1}$, and $R^{8a2}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; one or more hydrogen atoms in the alkyl group, the alkenyl group, the alkoxy group, or the alkenyloxy group may be substituted with fluorine atoms; a methylene group in the alkyl group, the alkenyl group, the alkoxy group, or the alkenyloxy group may be substituted with an oxygen atom as long as oxygen atoms do not directly bond to each other and may be substituted with a carbonyl group as long as carbonyl groups do not directly bond to each other;

$n^{a2}$ represents 0 or 1; $A^{1a2}$ represents a 1,4-cyclohexylene group, a 1,4-phenylene group, or a tetrahydropyran-2,5-diyl group; and one or more hydrogen atoms in the 1,4-phenylene group in the general formula (IVa1) and the general formula (IVa2) may be substituted with fluorine atoms.)

Specifically, the compounds represented by the general formula (IVa1) are preferably compounds represented by formula (IVa1-1) to formula (IVa1-8).

[Chem. 24]

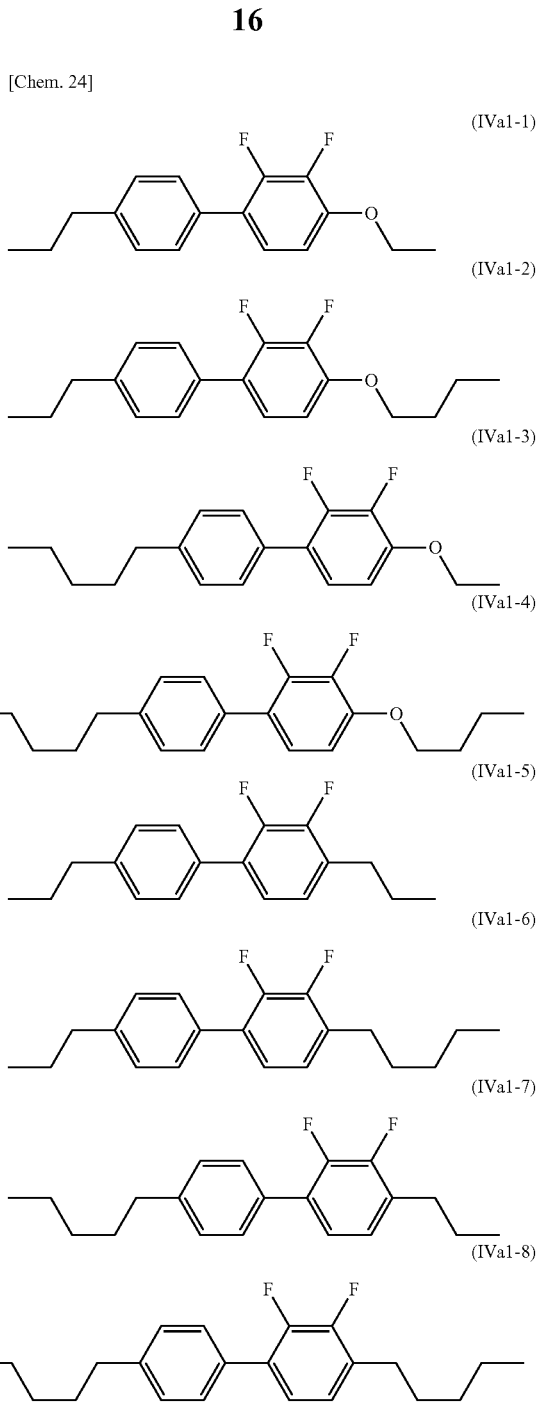

The compounds represented by the general formula (IVa1) are more preferably compounds represented by formula (IVa1-1) to formula (IVa1-4), further preferably compounds represented by formula (IVa1-1) and formula (IVa1-3), and particularly preferably a compound represented by formula (IVa1-1).

When four or more of the compounds represented by the general formula (IVa1) are used, the compounds represented by the formula (IVa1-1) to the formula (IVa1-4) are preferably used in combination and the content of the compounds represented by the formula (IVa1-1) to the formula (IVa1-4) in the compounds represented by the general formula (IVa1) is preferably 50 mass % or more, more preferably 70 mass % or more, more preferably 80 mass % or more, particularly preferably 85 mass % or more, and most preferably 90 mass % or more.

When three of the compounds represented by the general formula (IVa1) are used, the compounds represented by the formula (IVa1-1) to the formula (IVa1-3) are preferably used in combination and the content of the compounds represented by the formula (IVa1-1) to the formula (IVa1-3) in the compounds represented by the general formula (IVa1) is preferably 50 mass % or more, more preferably 70 mass % or more, more preferably 80 mass % or more, particularly preferably 85 mass % or more, and most preferably 90 mass % or more.

When two of the compounds represented by the general formula (IVa1) are used, the compounds represented by the formula (IVa1-1) and the formula (IVa1-3) are preferably used in combination and the content of the compounds represented by the formula (IVa1-1) and the formula (IVa1-3) in the compounds represented by the general formula (IVa1) is preferably 50 mass % or more, more preferably 70 mass % or more, more preferably 80 mass % or more, particularly preferably 85 mass % or more, and most preferably 90 mass % or more.

The compounds represented by the general formula (IVa2) are preferably compounds represented by general formula (IVa2-1) to general formula (IVa2-9).

[Chem. 25]

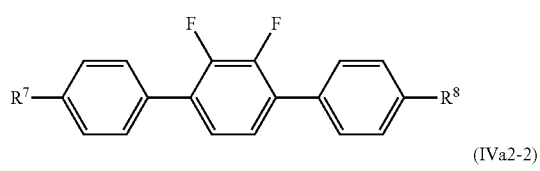
(IVa2-1)

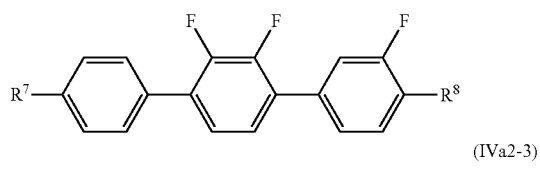
(IVa2-2)

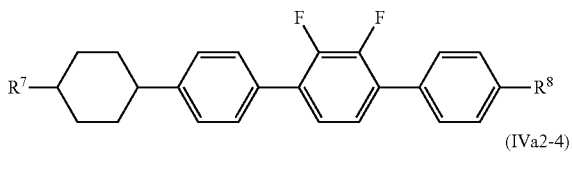
(IVa2-3)

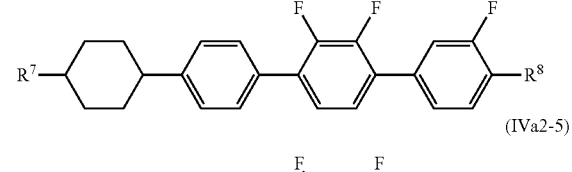
(IVa2-4)

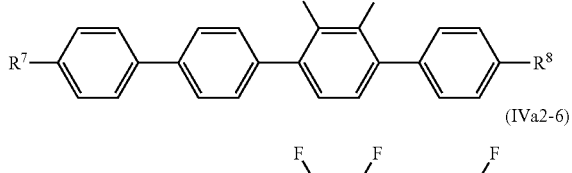
(IVa2-5)

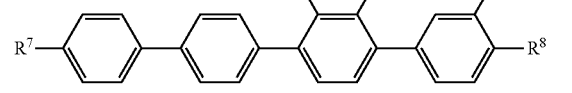
(IVa2-6)

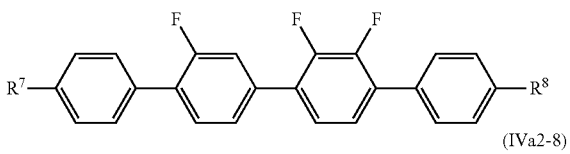
(IVa2-7)

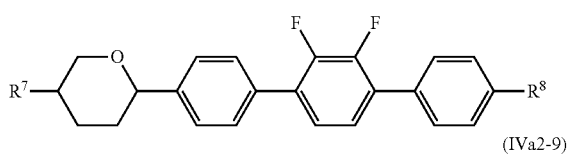
(IVa2-8)

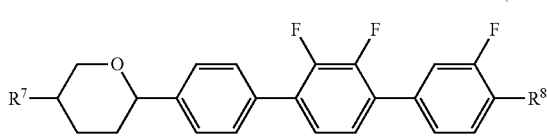
(IVa2-9)

(In the formulae, $R^7$ represents the same meaning as $R^7$ in the general formula (IV) and $R^8$ represents the same meaning as $R^8$ in the general formula (IV).)

When the compounds represented by the general formula (IVa2) are used, the compound represented by the formula (IVa2-1) is preferably used. The content of the compound represented by the formula (IVa2-1) in the compounds represented by the general formula (IVa2) is preferably 50 mass % or more, more preferably 70 mass % or more, more preferably 80 mass % or more, particularly preferably 85 mass % or more, and most preferably 90 mass % or more.

In the general formula (IVa2), $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, preferably each independently represent an alkyl group having 1 to 8 carbon atoms or an alkenyl group having 2 to 8 carbon atoms, more preferably each independently represent an alkyl group having 2 to 5 carbon atoms or an alkenyl group having 2 to 5 carbon atoms, more preferably each represent an alkyl group having 2 or 5 carbon atoms, and preferably each represent a linear group. When $R^7$ and $R^8$ each represent an alkyl group, the numbers of carbon atoms in $R^7$ and $R^8$ are preferably different from each other.

More specifically, a compound with $R^7$ representing a propyl group and $R^8$ representing an ethyl group or a compound with $R^7$ representing a butyl group and $R^8$ representing an ethyl group is preferred.

The 1,4-cyclohexyl group in the present invention is preferably a trans-1,4-cyclohexyl group.

The liquid crystal composition according to the present invention contains the compounds represented by the general formula (I) and the general formula (II) as essential components and may further contain the compounds represented by the general formula (IV) (which exclude the compounds represented by the general formula (II)). The total content of the compounds represented by the general formula (I), the general formula (II), and the general formula (IV) in the liquid crystal composition is preferably 80 to 100 mass %, more preferably 85 to 100 mass %, more preferably 90 to 100 mass %, particularly preferably 95 to 100 mass %, and most preferably 97 to 100 mass %.

The lower limit of the total content of the compounds represented by the general formula (I) and the general formula (II) in the liquid crystal composition of the present invention is preferably 55 mass %, more preferably 65 mass %, more preferably 70 mass %, particularly preferably 73 mass %, and most preferably 75 mass %. The upper limit of the total content is preferably 85 mass %, more preferably 90 mass %, more preferably 92 mass %, particularly preferably 94 mass %, and most preferably 95 mass %.

The liquid crystal composition according to the present invention preferably does not contain a compound having a structure in which oxygen atoms bond to each other, such as a peracid (—CO—OO—) structure, in its molecule.

When an importance is given to the reliability and long-term stability of the liquid crystal composition, the content of a compound having a carbonyl group is preferably 5 mass % or less, more preferably 3 mass % or less, and more preferably 1 mass % or less relative to the total mass of the composition. Most preferably, the liquid crystal composition substantially does not contain the compound having a carbonyl group.

The content of a compound in which all the intramolecular ring structures are six-membered rings is preferably increased. The content of the compound in which all the intramolecular ring structures are six-membered rings is preferably 80 mass % or more, more preferably 90 mass % or more, and more preferably 95 mass % or more relative to the total mass of the composition. Most preferably, the liquid crystal composition is substantially constituted by only compounds in which all the intramolecular ring structures are six-membered rings.

To suppress the degradation of the liquid crystal composition due to oxidation, the content of a compound having a cyclohexenylene group as a ring structure is preferably decreased. The content of the compound having a cyclohexenylene group is preferably 10 mass % or less and more preferably 5 mass % or less relative to the total mass of the composition. More preferably, the liquid crystal composition substantially does not contain the compound having a cyclohexenylene group.

To suppress the degradation of the liquid crystal composition due to oxidation, the content of a compound having —CH═CH— as a linking group is preferably decreased. The content of the compound is preferably 10 mass % or less and more preferably 5 mass % or less relative to the total mass of the composition. More preferably, the liquid crystal composition substantially does not contain the compound.

When an importance is given to the improvement in viscosity and $T_{NI}$, the content of a compound intramolecularly having a 2-methylbenzene-1,4-diyl group whose hydrogen atoms may be substituted with halogens is preferably decreased. The content of the compound intramolecularly having the 2-methylbenzene-1,4-diyl group is preferably 10 mass % or less and more preferably 5 mass % or less relative to the total mass of the composition. More preferably, the liquid crystal composition substantially does not contain the compound intramolecularly having a 2-methylbenzene-1,4-diyl group.

In the case where the compounds contained in the composition according to the present invention have an alkenyl group as a side chain, when the alkenyl group bonds to cyclohexane, the number of carbon atoms in the alkenyl group is preferably 2 to 5. When the alkenyl group bonds to benzene, the number of carbon atoms in the alkenyl group is preferably 4 or 5. The unsaturated bond of the alkenyl group is preferably not directly bonded to benzene. When an importance is given to the stability of the liquid crystal composition, the content of a compound having an alkenyl group as a side chain and having a 2,3-difluorobenzene-1,4-diyl group is preferably decreased. The content of the compound is preferably 10 mass % or less and more preferably 5 mass % or less relative to the total mass of the composition. More preferably, the liquid crystal composition substantially does not contain the compound.

The liquid crystal composition according to the present invention has a negative dielectric anisotropy $\Delta\epsilon$, and the absolute value of the dielectric anisotropy is 2 or more. The dielectric anisotropy $\Delta\epsilon$ at 25° C. is preferably −2.0 to −6.0, more preferably −2.5 to −5.0, and particularly preferably −2.5 to −4.0. More specifically, when an importance is given to response speed, the dielectric anisotropy $\Delta\epsilon$ is preferably −2.5 to −3.4. When an importance is given to drive voltage, the dielectric anisotropy $\Delta\epsilon$ is preferably −3.4 to −4.0.

The refractive index anisotropy $\Delta n$ of the liquid crystal composition according to the present invention at 25° C. is preferably 0.08 to 0.13 and more preferably 0.09 to 0.12. More specifically, the refractive index anisotropy $\Delta n$ is preferably 0.10 to 0.12 for a small cell gap and 0.08 to 0.10 for a large cell gap.

The rotational viscosity ($\gamma_1$) of the liquid crystal composition according to the present invention is preferably 150 or less, more preferably 130 or less, and particularly preferably 120 or less.

In the liquid crystal composition according to the present invention, Z, which is a function of rotational viscosity and refractive index anisotropy, preferably has a particular value.

$$z = \gamma 1/\Delta n^2 \qquad [\text{Math. 1}]$$

(In the formula, $\gamma_1$ represents a rotational viscosity and $\Delta n$ represents a refractive index anisotropy.)

Z is preferably 13000 or less, more preferably 12000 or less, and particularly preferably 11000 or less.

The nematic phase-isotropic liquid phase transition temperature ($T_{ni}$) of the liquid crystal composition according to the present invention is 60° C. or higher, preferably 75° C. or higher, more preferably 80° C. or higher, and more preferably 90° C. or higher.

The liquid crystal composition according to the present invention needs to have a specific resistance of $10^{12}$ (Ω·m) or more, and the specific resistance is preferably $10^{13}$ (Ω·m) and more preferably $10^{14}$ (Ω·m) or more.

In addition to the above compounds, the liquid crystal composition according to the present invention may further contain a typical nematic liquid crystal, a smectic liquid crystal, a cholesteric liquid crystal, an antioxidant, an ultraviolet absorber, and the like in accordance with the application. When chemical stability is required for the liquid crystal composition, the liquid crystal composition preferably does not include chlorine atoms in its molecule. When stability for light such as ultraviolet light is required for the liquid crystal composition, the liquid crystal composition desirably does not intramolecularly include condensed rings or the like that have a large conjugation length and an absorption peak in an ultraviolet region, such as a naphthalene ring.

(Liquid Crystal Display Device)

The above-described liquid crystal composition according to the present invention is applied to an FFS mode liquid crystal display device. Hereafter, an example of the FFS mode liquid crystal display device according to the present invention will be described with reference to FIGS. 1 to 6.

Figure 3:
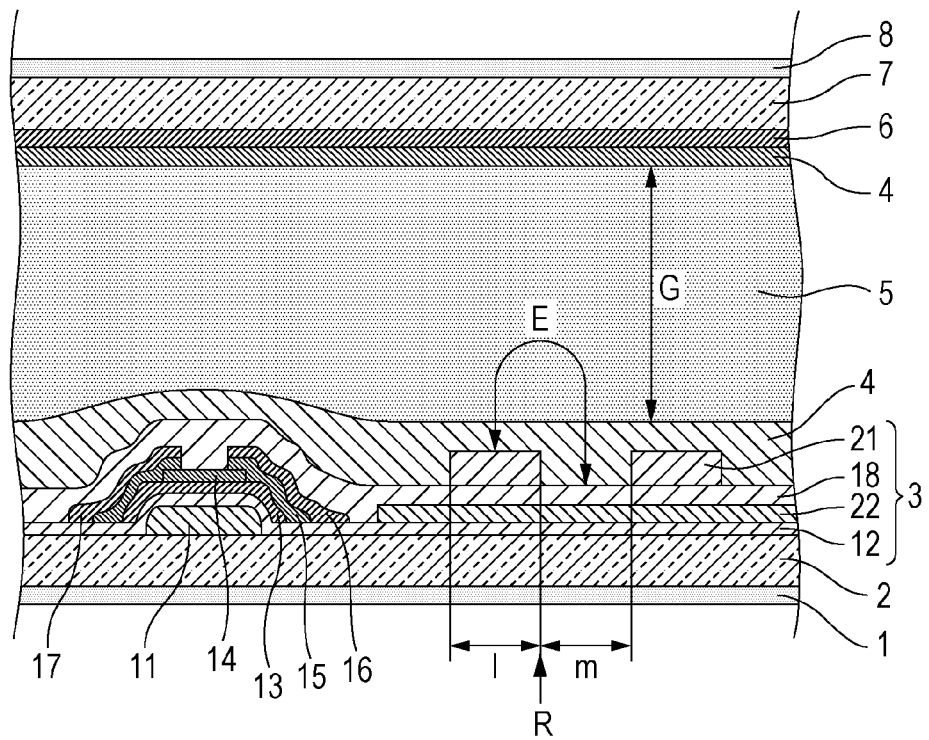
FIG. 3 is a sectional view of the liquid crystal display device shown in FIG. 1, the sectional view being taken along line III-III in FIG. 2.

FIG. 1 schematically shows a structure of a liquid crystal display device. In FIG. 1, components are illustrated in a separated manner for ease of description. As shown in FIG. 1, a liquid crystal display device 10 according to the present invention is an FFS mode liquid crystal display device including a liquid crystal composition (or a liquid crystal layer 5) sandwiched between a first transparent insulating substrate 2 and a second transparent insulating substrate 7 disposed so as to face each other, the liquid crystal composition being the liquid crystal composition according to the present invention. An electrode layer 3 is formed on a surface of the first transparent insulating substrate 2 on the liquid crystal layer 5 side. A pair of alignment films 4 that are directly in contact with the liquid crystal composition constituting the liquid crystal layer 5 and induce homogeneous alignment are disposed between the liquid crystal layer 5 and the first transparent insulating substrate 2 and between the liquid crystal layer 5 and the second transparent insulating substrate 7. Liquid crystal molecules in the liquid crystal composition are aligned so as to be substantially parallel to the substrates 2 and 7 when no voltage is applied. As shown in FIGS. 1 and 3, the first transparent insulating substrate 2 and the second transparent insulating substrate 7 may be sandwiched between a pair of polarizing plates 1 and 8. In FIG. 1, a color filter 6 is further disposed between the second substrate 7 and the alignment film 4.

In short, the liquid crystal display device 10 according to the present invention includes the first polarizing plate 1, the first substrate 2, the electrode layer 3 including a thin film transistor, the alignment film 4, the liquid crystal layer 5 containing the liquid crystal composition, the alignment film 4, the color filter 6, the second substrate 7, and the second polarizing plate 8 which are sequentially stacked. The first substrate 2 and the second substrate 7 can be composed of glass or a transparent flexible material such as plastic, and one of the first substrate 2 and the second substrate 7 may be composed of an opaque material such as silicon. The substrates 2 and 7 are bonded to each other with a sealing material or a sealant, such as an epoxy thermosetting composition, disposed in a peripheral region. For example, particulate spacers such as glass particles, plastic particles, or alumina particles or columnar spacers composed of a resin and formed by photolithography may be disposed between the substrates 2 and 7 in order to keep the distance between the substrates 2 and 7.

Figure 2:
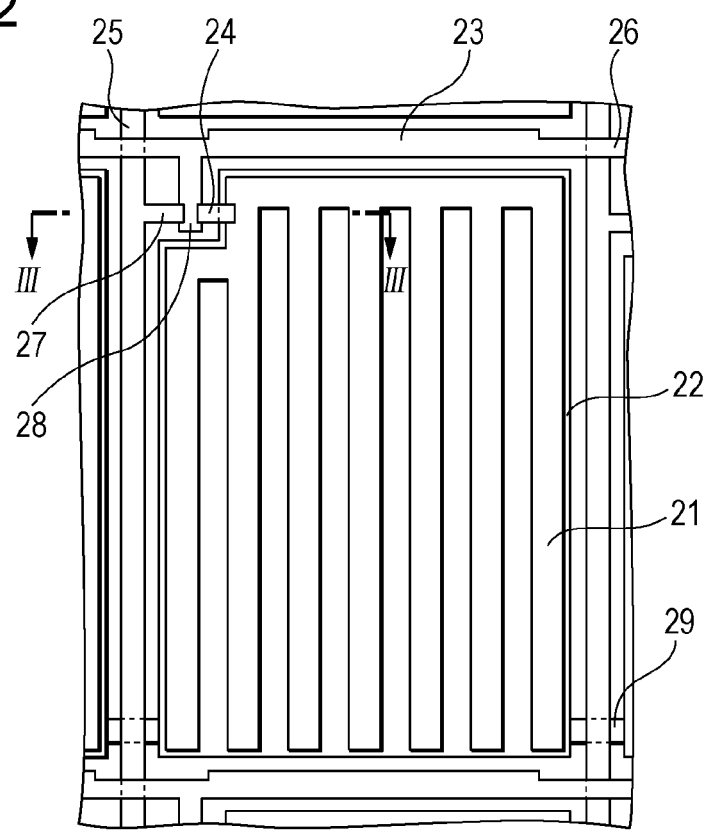
FIG. 2 is an enlarged plan view of a region of an electrode layer 3 formed on a substrate 2 in FIG. 1, the region being enclosed by line II.

FIG. 2 is an enlarged plan view of a region of the electrode layer 3 formed on the substrate 2 in FIG. 1, the region being enclosed by line II. FIG. 3 is a sectional view of the liquid crystal display device shown in FIG. 1, the sectional view being taken along line III-III in FIG. 2. As shown in FIG. 2, the electrode layer 3 including a thin film transistor and formed on the surface of the first substrate 2 includes a plurality of gate bus lines 26 for supplying scanning signals and a plurality of data bus lines 25 for supplying display signals, the gate bus lines 26 and the data bus lines 25 intersecting each other so as to form a matrix. FIG. 2 shows only a pair of gate bus lines 26 and a pair of data bus lines 25.

A unit pixel of the liquid crystal display is formed in each of regions surrounded by the plurality of gate bus lines 26 and the plurality of data bus lines 25. In the unit pixel, a pixel electrode 21 and a common electrode 22 are formed. A thin film transistor including a source electrode 27, a drain electrode 24, and a gate electrode 28 is disposed near each of intersections of the gate bus lines 26 and the data bus lines 25. The thin film transistor is connected to the pixel electrode 21 as a switching element for supplying display signals to the pixel electrode 21. Furthermore, a common line 29 is disposed so as to be parallel to the gate bus lines 26. The common line 29 is connected to the common electrode 22 to supply common signals to the common electrode 22.

As shown in FIG. 3, a thin film transistor according to a preferred embodiment includes a gate electrode 11 formed on a surface of a substrate 2, a gate insulating layer 12 disposed so as to cover the gate electrode 11 and substantially the entire surface of the substrate 2, a semiconductor layer 13 formed on a surface of the gate insulating layer 12 so as to face the gate electrode 11, a protective film 14 disposed so as to cover part of a surface of the semiconductor layer 17, a drain electrode 16 disposed so as to cover one-side portions of the protective film 14 and the semiconductor layer 13 and so as to be in contact with the gate insulating layer 12 formed on the surface of the substrate 2, a source electrode 17 disposed so as to cover the other-side portions of the protective film 14 and the semiconductor layer 13 and so as to be in contact with the gate insulating layer 12 formed on the surface of the substrate 2, and an insulating protective layer 18 disposed so as to cover the drain electrode 16 and the source electrode 17. An anodic oxide film (not shown) may be formed on a surface of the gate electrode 11 for the purpose of, for example, removing a difference in level formed by the gate electrode.

The semiconductor layer 13 may be composed of amorphous silicon, polycrystalline polysilicon, or the like. The semiconductor layer 13 is preferably a transparent semiconductor film composed of, for example, ZnO, IGZO (In—Ga—Zn—O), or ITO because harmful effects of photocarriers due to light absorption can be suppressed and the aperture ratio of a device can be increased.

An ohmic contact layer 15 may be disposed between the semiconductor layer 13 and the drain electrode 16 or the source electrode 17 in order to decrease the width and height of a Schottky barrier. The ohmic contact layer may be composed of a material to which an impurity such as phosphorus is added in a high concentration. Examples of the material include an n-type amorphous silicon and an n-type polycrystalline polysilicon.

The gate bus lines 26, the data bus lines 25, and the common line 29 are preferably metal films. The metal films are preferably composed of Al, Cu, Au, Ag, Cr, Ta, Ti, Mo, W, Ni, or an alloy thereof and more preferably Al or an Al alloy. The insulating protective layer 18 is a layer having an insulating function and is formed of silicon nitride, silicon dioxide, or silicon oxynitride.

In the embodiment shown in FIGS. 2 and 3, the common electrode 22 is a plate-shaped electrode formed on substantially the entire surface of the gate insulating layer 12 whereas the pixel electrode 21 is a comb-shaped electrode formed on the insulating protective layer 18 that covers the common electrode 22. In other words, the common electrode 22 is disposed so as to be closer to the first substrate 2 than the pixel electrode 21, and these electrodes overlap each other with the insulating protective layer 18 disposed therebetween. The pixel electrode 21 and the common electrode 22 are formed of a transparent conductive material such as ITO (indium tin oxide), IZO (indium zinc oxide), or IZTO (indium zinc tin oxide). Since the pixel electrode 21 and the common electrode 22 are formed of a transparent conductive material, the opening area in a unit pixel is increased, which increases the aperture ratio and the transmittance.

Since a fringing field is formed between the pixel electrode 21 and the common electrode 22, the pixel electrode 21 and the common electrode 22 are formed so that the interelectrode distance R between the pixel electrode 21 and the common electrode 22 is smaller than the distance G between the first substrate 2 and the second substrate 7. Note that the interelectrode distance R indicates a distance between the electrodes in a direction horizontal to the substrates. FIG. 3 shows an example in which the interelectrode distance R is 0 because the plate-shaped common electrode 22 and the comb-shaped pixel electrode 21 overlap each other. The interelectrode distance R is smaller than the distance (cell gap) G between the first substrate 2 and the second substrate 7, and therefore the fringing field E is formed. Thus, in an FFS mode liquid crystal display device, a horizontal electric field formed in a direction perpendicular to lines that form a comb-like shape of the pixel electrode 21 and a parabolic electric field can be used. The electrode width l of a comb teeth portion of the pixel electrode 21 and the width m of a gap between comb teeth portions of the pixel electrode 21 are preferably set in such a manner that all liquid crystal molecules in the liquid crystal layer 5 are driven by the generated electric field.

In the color filter 6, a black matrix (not shown) is preferably formed in regions corresponding to the thin film transistor and a storage capacitor 23 in order to prevent the leakage of light.

Figure 4:
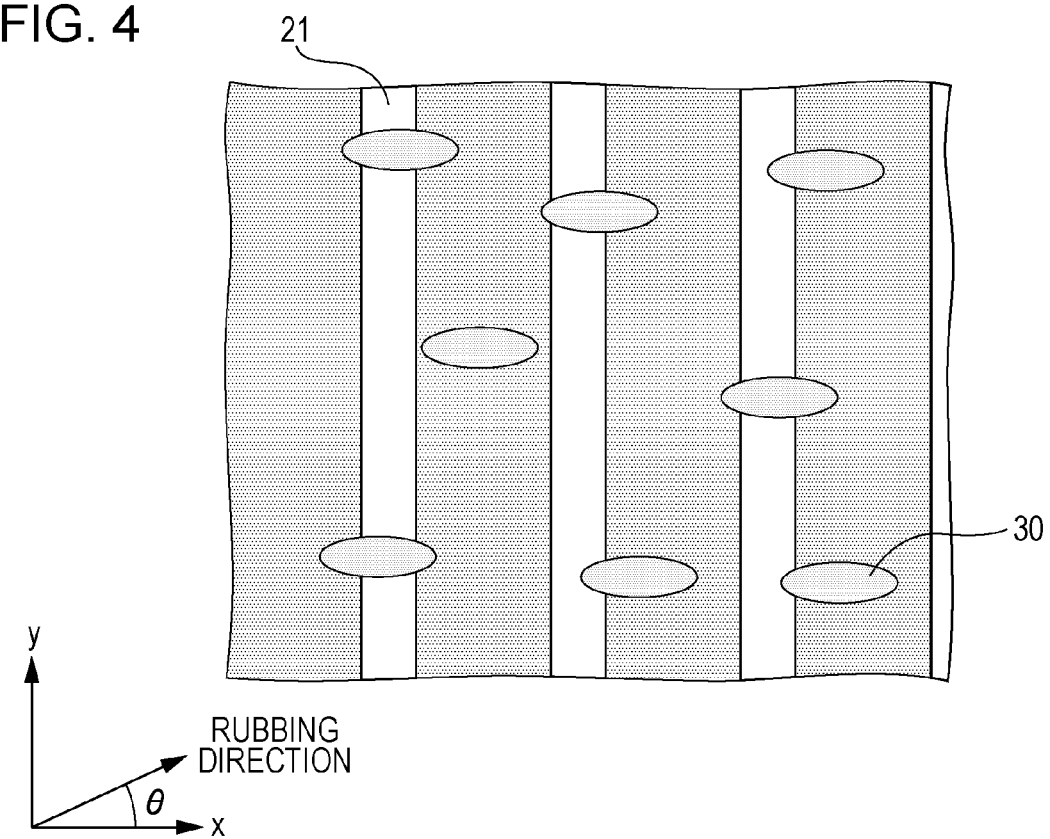
FIG. 4 schematically shows a liquid crystal alignment direction induced by alignment films 4.

A pair of alignment films 4 that induce homogeneous alignment are disposed on the electrode layer 3 and the color filter 6 so as to be directly in contact with the liquid crystal composition constituting the liquid crystal layer 5. The alignment films 4 are, for example, polyimide films subjected to a rubbing treatment, and the alignment directions of the alignment films are parallel to each other. A rubbing direction (alignment direction of liquid crystal composition) of the alignment films 4 according to this embodiment will be described with reference to FIG. 4. FIG. 4 schematically shows a liquid crystal alignment direction induced by the alignment films 4. In the present invention, a liquid crystal composition having a negative dielectric anisotropy is used. Therefore, when the direction (direction in which an horizontal electric field is formed) perpendicular to lines that form a comb-like shape of the pixel electrode 21 is assumed to be an x-axis direction, liquid crystal molecules 30 are preferably aligned so that the angle θ between the x-axis direction and a major-axis direction of each liquid crystal molecule 30 is about 0° to 45°. FIG. 3 shows an example in which the angle θ between the x-axis direction and the major-axis direction of each liquid crystal molecule 30 is about 0°. The liquid crystal alignment direction is induced in such a manner in order to increase the maximum transmittance of a liquid crystal display.

The polarizing plate 1 and the polarizing plate 8 can be adjusted so that a satisfactory viewing angle and a high contrast are achieved by adjusting the polarization axis of each of the polarizing plates. The polarizing plate 1 and the polarizing plate 8 preferably have transmission axes that are perpendicular to each other so that a display device is operated in a normally black mode. In particular, one of the polarizing plate 1 and the polarizing plate 8 is preferably disposed so as to have a transmission axis parallel to the alignment direction of the liquid crystal molecules 30. The product of the refractive index anisotropy Δn of the liquid crystal and the cell thickness d is preferably adjusted so that the contrast is maximized. Furthermore, a phase difference film may be used to increase the viewing angle.

In the FFS mode liquid crystal display 10 having the above structure, an image signal (voltage) is supplied to the pixel electrode 21 through the thin film TFT to generate a fringing field between the pixel electrode 21 and the common electrode 22, and liquid crystal is driven by the fringing field. That is, when no voltage is applied, the liquid crystal molecules 30 are arranged so that the major-axis direction is parallel to the alignment direction of the alignment films 4. When a voltage is applied, an equipotential line of a parabolic electric field is formed between the pixel electrode 21 and an upper portion of the common electrode 22, thereby rotating the liquid crystal molecules 30 in the liquid crystal layer 5 along the formed electric field. In the present invention, since the liquid crystal molecules 30 have a negative dielectric anisotropy, the liquid crystal molecules 30 rotate so that the major-axis direction of the liquid crystal molecules 30 is perpendicular to the direction of the generated electric field. The liquid crystal molecules 30 located near the pixel electrode 21 are easily affected by the fringing field. However, the polarization direction of the liquid crystal molecules 30 having a negative dielectric anisotropy is a minor-axis direction of the molecules, and thus the major-axis direction of the molecules does not rotate to a direction perpendicular to the alignment films 4. As a result, the major-axis direction of all the liquid crystal molecules 30 in the liquid crystal layer 5 remains in a direction parallel to the alignment films 4. Accordingly, a high transmittance can be achieved compared with an FFS mode liquid crystal display device including liquid crystal molecules 30 having a positive dielectric anisotropy.

Figure 5:
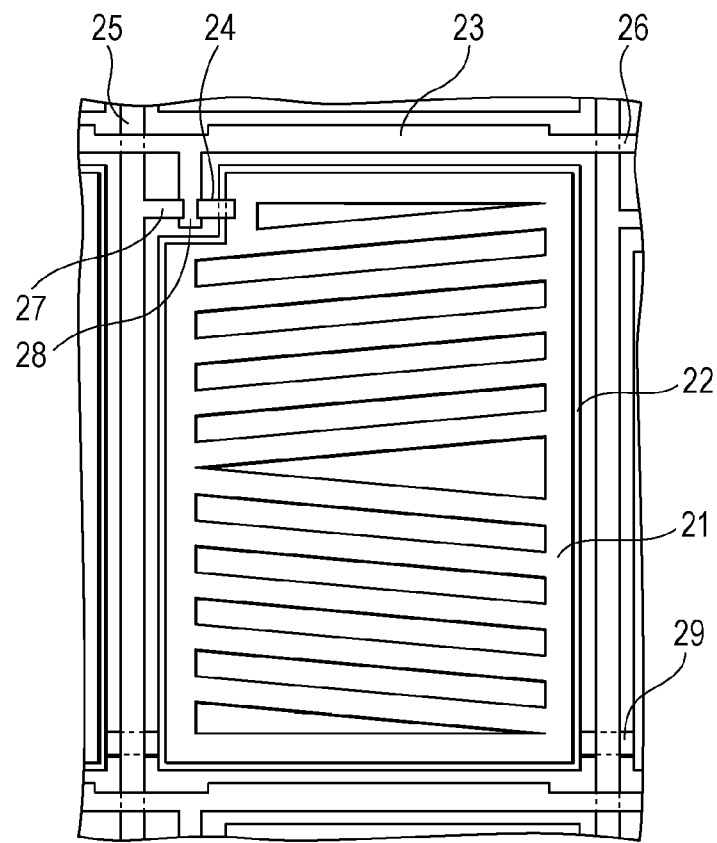
FIG. 5 shows another example of an enlarged plan view of a region of an electrode layer 3 formed on a substrate 2 in FIG. 1, the region being enclosed by line II.

The FFS mode liquid crystal display device described with reference to FIGS. 1 to 4 is merely an example, and various modifications can be made without departing from the technical ideas of the present invention. For example, FIG. 5 shows another example of an enlarged plan view of a region of the electrode layer 3 formed on the substrate 2 in FIG. 1, the region being enclosed by line II. As shown in FIG. 5, the pixel electrode 21 may have slits. The slits may be formed so as to have an angle of inclination relative to the gate bus lines 26 or the data bus lines 25.

Figure 6:
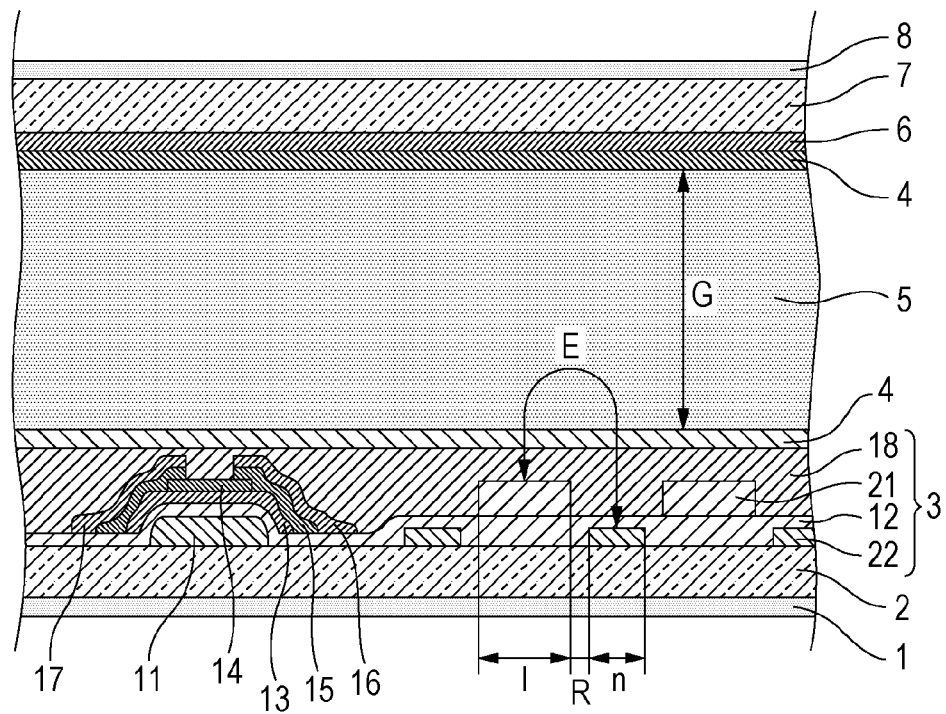
FIG. 6 shows another example of a sectional view of the liquid crystal display device shown in FIG. 1, the sectional view being taken along line III-III in FIG. 2.

FIG. 6 shows another example of a sectional view of the liquid crystal display device shown in FIG. 1, the sectional view being taken along line III-III in FIG. 2. In the example shown in FIG. 6, a comb-shaped common electrode 22 or a common electrode 22 having slits is used, and the interelectrode distance R between the pixel electrode 21 and the common electrode 22 is a. Although FIG. 3 shows an example in which the common electrode 22 is formed on the gate insulating layer 12, the common electrode 22 may be formed on the first substrate 2 and the pixel electrode 21 may be formed thereon with the gate insulating layer 12 disposed therebetween as shown in FIG. 6. The electrode width 1 of the pixel electrode 21, the electrode width n of the common electrode 22, and the interelectrode distance R are preferably suitably adjusted in such a manner that all liquid crystal molecules in the liquid crystal layer 5 are driven by the generated electric field.

Since the FFS mode liquid crystal display device according to the present invention includes a particular liquid crystal composition, both high-speed response and the suppression of display defects can be achieved.

In FFS mode liquid crystal display devices, the liquid crystal layer 5 is injected between the first substrate 2 and the second substrate 7 by, for example, a vacuum injection method or a one-drop-fill (ODF) method. In the present invention, the generation of drop marks formed when a liquid crystal composition is dropped onto a substrate can be suppressed in the ODF method. The drop marks are defined as a phenomenon in which a mark formed by dropping a liquid crystal composition appears white on a black screen.

The generation of drop marks is considerably affected by an injected liquid crystal material and also inevitably affected by the structure of the display device. In FFS mode liquid crystal display devices, the thin film transistor, the comb-shaped pixel electrode 21 or the pixel electrode 21 having slits, and the like formed in the display device are highly likely to contact an ionic substance because only the thin alignment films 4 or only the thin alignment films 4 and the thin insulating protective layer 18 are members that block the liquid crystal composition. As a result, the generation of drop marks formed by the interaction between a metal material constituting the electrode and the liquid crystal composition cannot be avoided. However, the generation of drop marks is effectively suppressed by combining the FFS mode liquid crystal display devices with the liquid crystal composition of the present invention.

In the production process of liquid crystal display devices by the ODF method, an optimum amount of liquid crystal injected needs to be dropped in accordance with the size of a liquid crystal display device. The liquid crystal composition according to the present invention is less affected by a sudden change in pressure in a dropping device and an impact that occur when liquid crystal is dropped and thus the liquid crystal can be continuously dropped in a stable manner for a long time. Therefore, a high production yield of the liquid crystal display device can be maintained. In particular, in small-size liquid crystal display devices heavily used for fashionable smart phones, the optimum amount of liquid crystal injected is small and thus it is difficult to control the deviation from the optimum amount within a particular range. However, by using the liquid crystal composition according to the present invention, the amount of a liquid crystal material ejected can be stably maintained even in small-size liquid crystal display devices.

EXAMPLES

The present invention will now be further described below in detail based on Examples, but is not limited to Examples. In the compositions of Examples and Comparative Examples below, "%" means "mass %".

The properties that were measured in Examples are as follows.

$T_{NI}$: nematic phase-isotropic liquid phase transition temperature (° C.)

Δn: refractive index anisotropy at 25° C.

Δ∈: dielectric anisotropy at 25° C.

η: viscosity (mPa·s) at 20° C.

$γ_1$: rotational viscosity (mPa·s) at 25° C.

VHR: voltage holding ratio (%) at a frequency of 60 Hz at an applied voltage of 1 V at 60° C.

Image Sticking:

Image sticking evaluation for the liquid crystal display device was performed by performing uniform display on the entire screen after displaying a particular fixed pattern in a display area for 1000 hours, and visually evaluating the degree of the afterimage of the fixed pattern on the basis of the four-grade evaluation below.

A: No afterimage was observed.

B: Faint afterimage was observed but the degree of the afterimage was acceptable.

C: Afterimage was observed and the degree of the afterimage was unacceptable.

D: Very poor afterimage was observed.

Drop Mark:

Drop mark evaluation for the liquid crystal display device was performed by visually evaluating a drop mark that appeared white on a black screen on the basis of the four-grade evaluation below.

A: No afterimage was observed.

B: Faint afterimage was observed but the degree of the afterimage was acceptable.

C: Afterimage was observed and the degree of the afterimage was unacceptable.

D: Very poor afterimage was observed.

Process Compatibility:

Liquid crystal was dropped 100,000 times at 50 pL per dropping using a constant volume pump in an ODF process, and the changes in the amount of liquid crystal dropped for every 100 droppings, namely, "0 to 100th dropping, 101st to 200th dropping, 201st to 300th dropping, . . . 99901st to 100000th dropping", were evaluated on the basis of the following four grades.

A: Very little change was observed (liquid crystal display devices can be stably produced).

B: Slight change was observed but the degree thereof was acceptable.

C: The degree of change was unacceptable (yield was degraded due to generation of nonuniformity).

D: Considerable change was observed (liquid crystal leakage and vacuum bubbles occurred).

Solubility at Low Temperature:

The solubility at low temperature was evaluated as follows. After a liquid crystal composition was prepared, 1 g of the liquid crystal composition was weighed and placed in a 2 mL sample bottle. The resulting sample was continuously exposed to temperature change cycles, each cycle including "−20° C. (retained for 1 hour)→heating (0.1° C./min)→0° C. (retained for 1 hour)→heating (0.1° C./min)→20° C. (retained for 1 hour)→cooling (−0.1° C./min)→0° C. (retained for 1 hour)→cooling (−0.1° C./min)→−20° C.", in a temperature control test chamber. Generation of precipitates from the liquid crystal composition was visually observed and the following four-grade evaluation was performed.

A: No precipitates were observed for 600 hours or longer.

B: No precipitates were observed for 300 hours or longer.

C: Precipitates were observed within 150 hours.

D: Precipitates were observed within 75 hours.

In Examples, the following abbreviations are used to describe compounds.

(Side Chain)

n: —CnH2n+1, linear alkyl group having n carbon atoms

On: —OCnH2n+1, linear alkoxy group having n carbon atoms

V: —C=CH2, vinyl group

Vn: —C=C—CnH2n+1, 1-alkene having (n+1) carbon atoms (Ring Structure)

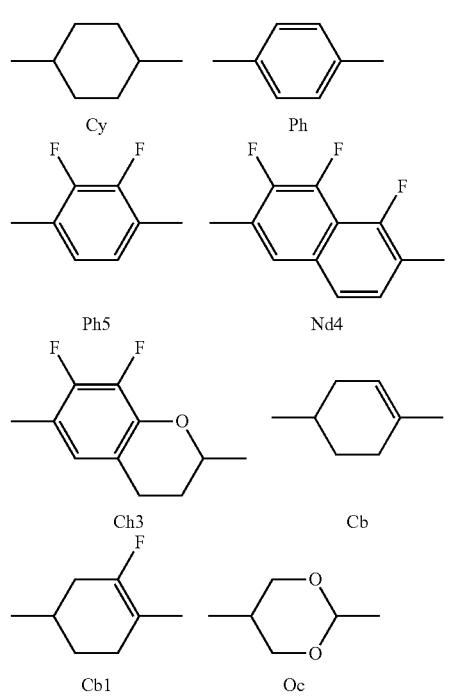

[Chem. 26]

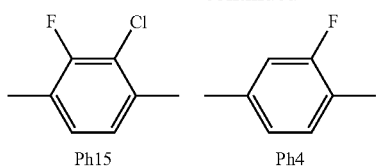

Example 1

Liquid Crystal Composition 1

A liquid crystal composition (liquid crystal composition 1) having a composition below was prepared and the physical properties of the composition were measured. The results are shown in Table 1.

An FFS mode liquid crystal display device having a cell thickness of 3.0 μm, which is typically used for TVs, was produced using the liquid crystal composition 1. The liquid crystal composition was injected by a dropping method and the image sticking, the drop mark, the process compatibility, and the solubility at low temperature were evaluated.

Note that the symbols on the left of the content are abbreviated descriptions of the above compounds.

[Chem. 27]

Example 1

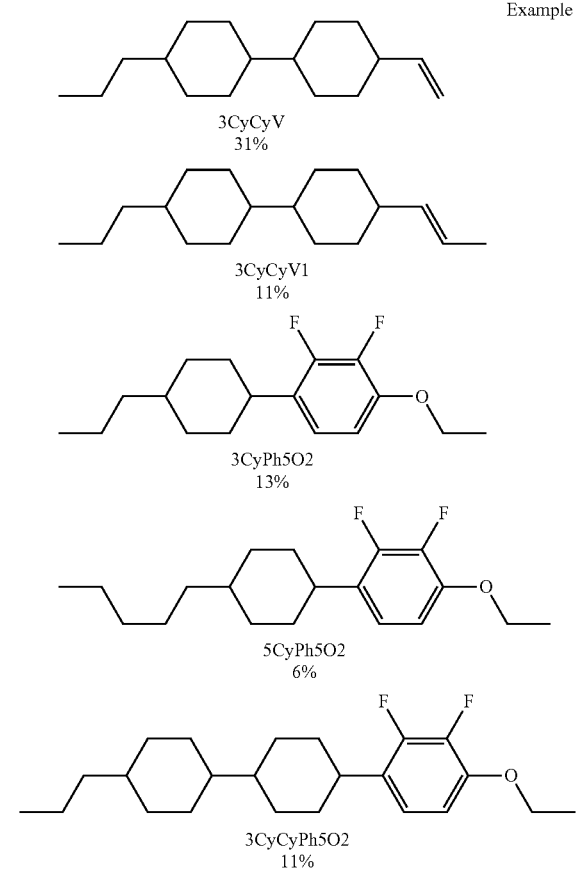

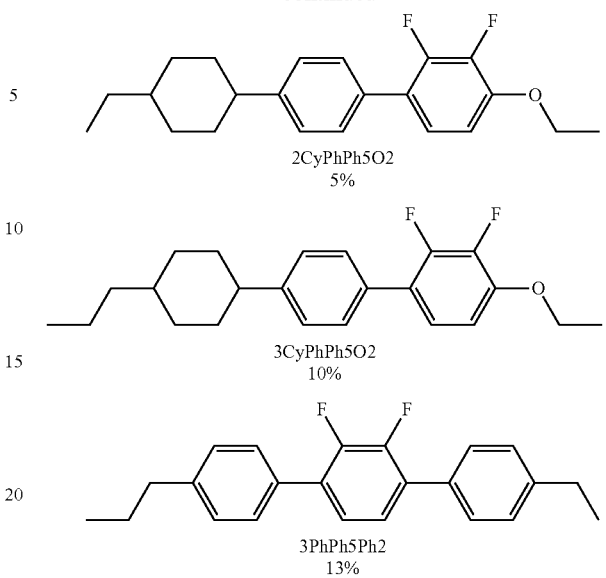

TABLE 1

| | |
|---|---|
| $T_{NI}/°$ C. | 75.6 |
| Δn | 0.109 |
| $n_o$ | 1.483 |
| Δε | −3.07 |
| $ε_⊥$ | 6.62 |
| η/mPa·s | 15.2 |
| $γ_1$/mPa·s | 98 |
| $γ_1/Δn^2 × 10^{-3}$ | 8.2 |
| $γ_1/Δn^2/|Δε|$ | 2.69 |
| Initial voltage holding ratio/% | 99.6 |
| Voltage holding ratio after 150° C. and 1 h/% | 99.0 |
| Evaluation of image sticking | A |
| Evaluation of drop mark | A |
| Evaluation of process compatibility | A |
| Evaluation of solubility at low temperature | A |

The liquid crystal composition 1 is found to have a $T_{NI}$ of 75.6° C., which is practical for liquid crystal compositions for TVs, a high absolute value of Δε, low η, and appropriate Δn. An FFS mode liquid crystal display device was produced using the liquid crystal composition 1 and the image sticking, the drop mark, the process compatibility, and the solubility at low temperature were evaluated by the above-described methods. The evaluation results were excellent.

Example 2

Liquid Crystal Composition 2

A liquid crystal composition (liquid crystal composition 2) having a composition below and designed so as to have the same $T_{NI}$, Δn, and Δε as those of the liquid crystal composition 1 was prepared, and the physical properties were measured. The results are shown in Table 2.

An FFS mode liquid crystal display device was produced using the liquid crystal composition 2 in the same manner as in Example 1. The image sticking, the drop mark, the process compatibility, and the solubility at low temperature were evaluated. The results are shown in Table 2.

TABLE 2

| Example 2 | |
|---|---|
| 3CyCyV | 32% |
| 3CyCyV1 | 12% |
| 3CyCyPh1 | 4% |
| 3CyPh5O2 | 7% |
| 3PhPh5O2 | 10% |
| 3CyCyPh5O2 | 10% |
| 4CyCyPh5O2 | 2% |
| 2CyPhPh5O2 | 5% |
| 3CyPhPh5O2 | 8% |
| 3PhPh5Ph2 | 5% |
| 4PhPh5Ph2 | 5% |
| $T_{NI}/°C.$ | 76.6 |
| $\Delta n$ | 0.110 |
| $n_o$ | 1.485 |
| $\Delta\epsilon$ | −3.03 |
| $\epsilon_\perp$ | 6.36 |
| $\eta/mPa \cdot s$ | 13.6 |
| $\gamma_1/mPa \cdot s$ | 90 |
| $\gamma_1/\Delta n^2 \times 10^{-3}$ | 7.4 |
| $\gamma_1/\Delta n^2/|\Delta\epsilon|$ | 2.45 |
| Initial voltage holding ratio/% | 99.5 |
| Voltage holding ratio after 150° C. and 1 h/% | 99.0 |
| Evaluation of image sticking | A |
| Evaluation of drop mark | A |
| Evaluation of process compatibility | A |
| Evaluation of solubility at low temperature | A |

The liquid crystal composition 2 is found to have a liquid crystal phase temperature range which is practical for liquid crystal compositions for TVs, a high absolute value of dielectric anisotropy, a low viscosity, and appropriate Δn. The same FFS mode liquid crystal display device as in Example 1 was produced using the liquid crystal composition 2 and the image sticking, the drop mark, the process compatibility, and the solubility at low temperature were evaluated by the above-described methods. The evaluation results were excellent.

Example 3

Liquid Crystal Composition 3

A liquid crystal composition (liquid crystal composition 3) having a composition below and designed so as to have the same $T_{NI}$, Δn, and Δ∈ as those of the liquid crystal compositions 1 and 2 was prepared, and the physical properties were measured. The results are shown in Table 3.

An FFS mode liquid crystal display device was produced using the liquid crystal composition 3 in the same manner as in Example 1. The image sticking, the drop mark, the process compatibility, and the solubility at low temperature were evaluated. The results are shown in Table 3.

TABLE 3

| Example 3 | |
|---|---|
| 3CyCyV | 35% |
| 3CyCyV1 | 12% |
| 3CyCyPh1 | 2% |
| 3CyPhPh2 | 6% |
| 3CyPh5O2 | 4% |
| 3PhPh5O2 | 10% |
| 5PhPh5O2 | 4% |
| 3CyCyPh5O2 | 3% |
| 2CyPhPh5O2 | 12% |
| 3CyPhPh5O2 | 12% |
| $T_{NI}/°C.$ | 76.1 |
| $\Delta n$ | 0.110 |
| $n_o$ | 1.486 |
| $\Delta\epsilon$ | −3.09 |
| $\epsilon_\perp$ | 6.45 |
| $\eta/mPa \cdot s$ | 12.2 |
| $\gamma_1/mPa \cdot s$ | 81 |
| $\gamma_1/\Delta n^2 \times 10^{-3}$ | 6.7 |
| $\gamma_1/\Delta n^2/|\Delta\epsilon|$ | 2.17 |
| Initial voltage holding ratio/% | 99.6 |
| Voltage holding ratio after 150° C. and 1 h/% | 99.2 |
| Evaluation of image sticking | A |
| Evaluation of drop mark | A |
| Evaluation of process compatibility | A |
| Evaluation of solubility at low temperature | A |

The liquid crystal composition 3 is found to have $T_{NI}$ which is practical for liquid crystal compositions for TVs, a high absolute value of Δ∈, low η, and appropriate Δn. The same FFS mode liquid crystal display device as in Example 1 was produced using the liquid crystal composition 3 and the image sticking, the drop mark, the process compatibility, and the solubility at low temperature were evaluated by the above-described methods. The evaluation results were excellent.

Comparative Examples 1 to 3

Vertical alignment mode liquid crystal display devices (VA mode liquid crystal display devices) having a cell thickness of 3.5 μm, which are typically used for TVs, were produced using the liquid crystal compositions 1 to 3.

The FFS mode liquid crystal display devices produced in Examples 1 to 3 and the VA mode liquid crystal display devices produced in Comparative Examples 1 to 3 were compared with each other in terms of transmittance, contrast ratio, and response speed. The results are shown below. The transmittance of the liquid crystal display devices in Examples 1 to 3 is a value obtained when the transmittance of the FFS mode devices before injection of the liquid crystal compositions is assumed to be 100%. The transmittance of the liquid crystal display devices in Comparative Examples 1 to 3 is a value obtained when the transmittance of the VA mode devices before injection of the liquid crystal compositions is assumed to be 100%.

TABLE 4

| | Example 1 | Comparative Example 1 | Example 2 | Comparative Example 2 | Example 3 | Comparative Example 3 |
|---|---|---|---|---|---|---|
| Display mode | n-FFS | VA | n-FFS | VA | n-FFS | VA |
| Liquid crystal composition used | Liquid crystal composition 1 | Liquid crystal composition 1 | Liquid crystal composition 2 | Liquid crystal composition 2 | Liquid crystal composition 3 | Liquid crystal composition 3 |
| Maximum transmittance | 89% | 87% | 90% | 86% | 90% | 87% |
| Contrast ratio | 289 | 280 | 293 | 277 | 302 | 288 |
| Response speed/ms | 4.7 | 8.3 | 4.4 | 7.6 | 3.7 | 6.6 |

The FFS mode display devices (Examples 1 to 3) produced using the liquid crystal compositions 1 to 3 had better properties than the VA mode liquid crystal display devices (Comparative Examples 1 to 3) produced using the same liquid crystal compositions in terms of maximum transmittance, contrast ratio, and response speed.

The FFS mode liquid crystal display device in which liquid crystal molecules are aligned in a direction parallel to the substrate and a fringing field is generated needs to have basic properties of liquid crystal different from those of the VA mode liquid crystal display device in which liquid crystal molecules are aligned in a direction perpendicular to the substrate and an electric field is vertically generated. The liquid crystal compositions 1 to 3 contain the compounds represented by the general formula (I) and the general formula (II), which are essential components in the present invention. Therefore, an improvement in transmittance, which is a distinctive characteristic of the FFS mode, is achieved without impairing the basic properties of a liquid crystal display device. However, because of such a difference between the FFS mode and the VA mode, it is difficult to predict the effects on the image sticking and drop marks from the previous findings. The liquid crystal display devices of the present invention exhibit good properties in these points.

Example 4

Liquid Crystal Composition 4

A liquid crystal composition (liquid crystal composition 4) having a composition below and designed so as to have the same $T_{NI}$, $\Delta n$, and $\Delta\epsilon$ as those of the liquid crystal compositions 1 to 3 was prepared, and the physical properties were measured. The results are shown in Table 5.

TABLE 5

| Example 4 | |
|---|---|
| 3CyCy2 | 25% |
| 3CyCy4 | 8% |
| 3CyCy5 | 5% |
| 3CyPh5O2 | 10% |
| 5CyPh5O2 | 9% |
| 3CyCyPh5O2 | 11% |
| 2CyPhPh5O2 | 10% |
| 3CyPhPh5O2 | 11% |
| 3PhPh5Ph2 | 5% |
| 4PhPh5Ph2 | 6% |
| $T_{NI}/°C$ | 75.9 |
| $\Delta n$ | 0.104 |
| $n_o$ | 1.483 |
| $\Delta\epsilon$ | −3.06 |
| $\epsilon_\perp$ | 6.56 |
| $\eta/mPa·s$ | 19.9 |
| $\gamma_1/mPa·s$ | 137 |
| $\gamma_1/\Delta n^2 \times 10^{-3}$ | 12.7 |
| $\gamma_1/\Delta n^2/|\Delta\epsilon|$ | 4.14 |

The liquid crystal composition 4 is found to have $T_{NI}$ which is practical for liquid crystal compositions for TVs, a high absolute value of $\Delta\epsilon$, low $\eta$, and appropriate $\Delta n$. An FFS mode liquid crystal display device produced using the liquid crystal composition 4 exhibited as good display properties as those of Examples 1 to 3.

Example 5

Liquid Crystal Composition 5

A liquid crystal composition (liquid crystal composition 5) having a composition below and designed so as to have the same $T_{NI}$, $\Delta n$, and $\Delta\epsilon$ as those of the liquid crystal compositions 1 to 4 was prepared, and the physical properties were measured. The results are shown in Table 6.

TABLE 6

| Example 5 | |
|---|---|
| 3CyCy2 | 25% |
| 3CyCy4 | 10% |
| 3CyCy5 | 5% |
| 3CyPh5O2 | 8% |
| 3PhPh5O2 | 9% |
| 3CyCyPh5O2 | 12% |
| 4CyCyPh5O2 | 2% |
| 2CyPhPh5O2 | 9% |
| 3CyPhPh5O2 | 9% |
| 3PhPh5Ph2 | 5% |
| 4PhPh5Ph2 | 6% |
| $T_{NI}/°C$ | 75.8 |
| $\Delta n$ | 0.108 |
| $n_o$ | 1.485 |
| $\Delta\epsilon$ | −3.17 |
| $\epsilon_\perp$ | 6.53 |
| $\eta/mPa·s$ | 18.5 |
| $\gamma_1/mPa·s$ | 131 |
| $\gamma_1/\Delta n^2 \times 10^{-3}$ | 11.2 |
| $\gamma_1/\Delta n^2/|\Delta\epsilon|$ | 3.54 |

The liquid crystal composition 5 is found to have $T_{NI}$ which is practical for liquid crystal compositions for TVs, a high absolute value of $\Delta\epsilon$, low $\eta$, and appropriate $\Delta n$. An FFS mode liquid crystal display device produced using the liquid crystal composition 5 exhibited as good display properties as those of Examples 1 to 3.

Example 6

Liquid Crystal Composition 6

A liquid crystal composition (liquid crystal composition 6) having a composition below and designed so as to have the same $T_{NI}$, $\Delta n$, and $\Delta\epsilon$ as those of the liquid crystal compositions 1 to 5 was prepared, and the physical properties were measured. The results are shown in Table 7.

TABLE 7

| Example 6 | |
|---|---|
| 3CyCy2 | 25% |
| 3CyCy4 | 10% |
| 3CyCy5 | 6% |
| 3CyCyPh1 | 10% |
| 3CyPh5O2 | 5% |
| 3PhPh5O2 | 10% |
| 5PhPh5O2 | 4% |
| 3CyCyPh5O2 | 6% |
| 2CyPhPh5O2 | 12% |
| 3CyPhPh5O2 | 12% |
| $T_{NI}/°C$ | 78.1 |
| $\Delta n$ | 0.101 |
| $n_o$ | 1.484 |
| $\Delta\epsilon$ | −3.00 |
| $\epsilon_\perp$ | 6.22 |
| $\eta/mPa·s$ | 15.9 |
| $\gamma_1/mPa·s$ | 111 |
| $\gamma_1/\Delta n^2 \times 10^{-3}$ | 10.9 |
| $\gamma_1/\Delta n^2/|\Delta\epsilon|$ | 3.63 |

The liquid crystal composition 6 is found to have $T_{NI}$ which is practical for liquid crystal compositions for TVs, a high absolute value of $\Delta\epsilon$, low $\eta$, and appropriate $\Delta n$. An FFS mode liquid crystal display device produced using the liquid crystal composition 6 exhibited as good display properties as those of Examples 1 to 3.

Example 7

Liquid Crystal Composition 7

A liquid crystal composition (liquid crystal composition 7) having a composition below and designed so as to have the same Δn as that of the liquid crystal compositions 1 to 6 and higher $T_{NI}$ and $\Delta\epsilon$ than the liquid crystal compositions 1 to 6 was prepared, and the physical properties were measured. The results are shown in Table 8.

TABLE 8

| Example 7 | |
|---|---|
| 3CyCyV | 24% |
| 3CyCyV1 | 10% |
| 3CyPh5O2 | 12% |
| 5CyPh5O2 | 8% |
| 3CyCyPh5O2 | 10% |
| 3CyCyPh5O3 | 8% |
| 4CyCyPh5O2 | 10% |
| 2CyPhPh5O2 | 5% |
| 3CyPhPh5O2 | 5% |
| 3PhPh5Ph2 | 8% |
| $T_{NI}$/° C. | 86.0 |
| Δn | 0.103 |
| $n_o$ | 1.481 |
| Δε | −3.95 |
| $\epsilon_\perp$ | 7.76 |
| η/mPa·s | 21.8 |
| $\gamma_1$/mPa·s | 134 |
| $\gamma_1/\Delta n^2 \times 10^{-3}$ | 12.6 |
| $\gamma_1/\Delta n^2/|\Delta\epsilon|$ | 3.20 |
| Initial voltage holding ratio/% | 99.9 |
| Voltage holding ratio after 150° C. and 1 h/% | 99.4 |
| Evaluation of image sticking | A |
| Evaluation of drop mark | A |
| Evaluation of process compatibility | A |
| Evaluation of solubility at low temperature | A |

The liquid crystal composition 7 is found to have $T_{NI}$ which is practical for liquid crystal compositions for TVs, a high absolute value of Δε, low η, and appropriate Δn. The same FFS mode liquid crystal display device as in Example 1 was produced using the liquid crystal composition 7 and the image sticking, the drop mark, the process compatibility, and the solubility at low temperature were evaluated by the above-described methods. The evaluation results were excellent.

Example 8

Liquid Crystal Composition 8

A liquid crystal composition (liquid crystal composition 8) having a composition below and designed so as to have the same $T_{NI}$, Δn, and Δε as those of the liquid crystal composition 7 was prepared, and the physical properties were measured. The results are shown in Table 9.

TABLE 9

| Example 8 | |
|---|---|
| 3CyCyV | 20% |
| 3CyCyV1 | 10% |
| 3CyCyPh1 | 7% |
| 3CyPh5O2 | 12% |
| 5CyPh5O2 | 6% |
| 3PhPh5O2 | 5% |
| 3CyCyPh5O2 | 12% |
| 3CyCyPh5O3 | 6% |
| 4CyCyPh5O2 | 10% |
| 2CyPhPh5O2 | 6% |
| 3PhPh5Ph2 | 6% |
| $T_{NI}$/° C. | 85.6 |
| Δn | 0.103 |
| $n_o$ | 1.482 |
| Δε | −4.05 |
| $\epsilon_\perp$ | 7.74 |
| η/mPa·s | 21.2 |
| $\gamma_1$/mPa·s | 128 |
| $\gamma_1/\Delta n^2 \times 10^{-3}$ | 12.1 |
| $\gamma_1/\Delta n^2/|\Delta\epsilon|$ | 2.98 |
| Initial voltage holding ratio/% | 99.9 |
| Voltage holding ratio after 150° C. and 1 h/% | 99.5 |
| Evaluation of image sticking | A |
| Evaluation of drop mark | A |
| Evaluation of process compatibility | A |
| Evaluation of solubility at low temperature | A |

The liquid crystal composition 8 is found to have $T_{NI}$ which is practical for liquid crystal compositions for TVs, a high absolute value of Δε, low η, and appropriate Δn. The same FFS mode liquid crystal display device as in Example 1 was produced using the liquid crystal composition 8 and the image sticking, the drop mark, the process compatibility, and the solubility at low temperature were evaluated by the above-described methods. The evaluation results were excellent.

Example 9

Liquid Crystal Composition 9

A liquid crystal composition (liquid crystal composition 9) having a composition below and designed so as to have the same $T_{NI}$, Δn, and Δε as those of the liquid crystal compositions 7 and 8 was prepared, and the physical properties were measured. The results are shown in Table 10.

TABLE 10

| Example 9 | |
|---|---|
| 3CyCyV | 23% |
| 3CyCyV1 | 10% |
| 3CyCyPh1 | 10% |
| 3CyPh5O2 | 10% |
| 5CyPh5O2 | 4% |
| 3PhPh5O2 | 8% |
| 3CyCyPh5O2 | 12% |
| 4CyCyPh5O2 | 7% |
| 2CyPhPh5O2 | 8% |
| 3CyPhPh5O2 | 8% |
| $T_{NI}$/° C. | 86.2 |
| Δn | 0.103 |
| $n_o$ | 1.483 |
| Δε | −3.96 |
| $\epsilon_\perp$ | 7.56 |
| η/mPa·s | 18.7 |
| $\gamma_1$/mPa·s | 112 |
| $\gamma_1/\Delta n^2 \times 10^{-3}$ | 10.6 |
| $\gamma_1/\Delta n^2/|\Delta\epsilon|$ | 2.67 |
| Initial voltage holding ratio/% | 99.8 |
| Voltage holding ratio after 150° C. and 1 h/% | 99.3 |
| Evaluation of image sticking | A |
| Evaluation of drop mark | A |
| Evaluation of process compatibility | A |
| Evaluation of solubility at low temperature | A |

The liquid crystal composition 9 is found to have $T_{NI}$ which is practical for liquid crystal compositions for TVs, a high absolute value of $\Delta\varepsilon$, low $\eta$, and appropriate $\Delta n$. The same FFS mode liquid crystal display device as in Example 1 was produced using the liquid crystal composition 9 and the image sticking, the drop mark, the process compatibility, and the solubility at low temperature were evaluated by the above-described methods. The evaluation results were excellent.

Comparative Examples 4 to 6

The same VA mode liquid crystal display devices as in Comparative Examples 1 to 3 were produced using the liquid crystal compositions 7 to 9.

The FFS mode liquid crystal display devices produced in Examples 7 to 9 and the VA mode liquid crystal display devices produced in Comparative Examples 4 to 6 were compared with each other in terms of transmittance, contrast ratio, and response speed. The results are shown in Table 11.

TABLE 11

|  | Example 7 | Comparative Example 4 | Example 8 | Comparative Example 5 | Example 9 | Comparative Example 6 |
|---|---|---|---|---|---|---|
| Display mode | n-FFS | VA | n-FFS | VA | n-FFS | VA |
| Liquid crystal composition used | Liquid crystal composition 7 | | Liquid crystal composition 8 | | Liquid crystal composition 9 | |
| Maximum transmittance/% | 88% | 85% | 88% | 86% | 89% | 87% |
| Contrast ratio | 278 | 268 | 285 | 265 | 294 | 260 |
| Response speed/ms | 7.4 | 13.0 | 7.1 | 12.7 | 6.5 | 10.8 |

The FFS mode display devices (Examples 7 to 9) produced using the liquid crystal compositions 7 to 9 had better properties than the VA mode liquid crystal display devices (Comparative Examples 4 to 6) produced using the same liquid crystal compositions in terms of maximum transmittance, contrast ratio, and response speed.

Example 10

Liquid Crystal Composition 10

A liquid crystal composition (liquid crystal composition 10) having a composition below and designed so as to have the same $T_{NI}$, $\Delta n$, and $\Delta\varepsilon$ as those of the liquid crystal compositions 7 to 9 was prepared, and the physical properties were measured. The results are shown in Table 12.

TABLE 12

| Example 10 | |
|---|---|
| 3CyCy2 | 22% |
| 3CyCy4 | 4% |
| 3CyCyPh1 | 4% |
| 3CyPh5O2 | 12% |
| 5CyPh5O2 | 10% |
| 3CyCyPh5O2 | 10% |
| 3CyCyPh5O3 | 6% |
| 4CyCyPh5O2 | 9% |
| 2CyPhPh5O2 | 8% |
| 3CyPhPh5O2 | 8% |
| 3PhPh5Ph2 | 4% |
| 4PhPh5Ph2 | 3% |
| $T_{NI}$/° C. | 85.7 |
| $\Delta n$ | 0.103 |
| $n_o$ | 1.482 |
| $\Delta\varepsilon$ | −4.08 |
| $\varepsilon_\perp$ | 7.92 |
| $\eta$/mPa·s | 26.6 |

TABLE 12-continued

| Example 10 | |
|---|---|
| $\gamma_1$/mPa·s | 172 |
| $\gamma_1/\Delta n^2 \times 10^{-3}$ | 16.2 |
| $\gamma_1/\Delta n^2/|\Delta\varepsilon|$ | 3.97 |

The liquid crystal composition 10 is found to have $T_{NI}$ which is practical for liquid crystal compositions for TVs, a high absolute value of $\Delta\varepsilon$, low $\eta$, and appropriate $\Delta n$. An FFS mode liquid crystal display device was produced using the liquid crystal composition 10 and the image sticking, the drop mark, the process compatibility, and the solubility at low temperature were evaluated by the above-described methods. The evaluation results were excellent.

Example 11

Liquid Crystal Composition 11

A liquid crystal composition having a composition below and designed so as to have the same $T_{NI}$, $\Delta n$, and $\Delta\varepsilon$ as those of the liquid crystal compositions 7 to 10 was prepared, and the physical properties were measured. The results are shown in Table 13.

TABLE 13

| Example 11 | |
|---|---|
| 3CyCy2 | 24% |
| 3CyCy4 | 8% |
| 3CyPh5O2 | 9% |
| 3PhPh5O2 | 8% |
| 3CyCyPh5O2 | 12% |
| 3CyCyPh5O3 | 10% |
| 4CyCyPh5O2 | 10% |
| 2CyPhPh5O2 | 6% |
| 3CyPhPh5O2 | 6% |
| 3PhPh5Ph2 | 4% |
| 4PhPh5Ph2 | 3% |
| $T_{NI}$/° C. | 86.0 |
| $\Delta n$ | 0.103 |
| $n_o$ | 1.483 |
| $\Delta\varepsilon$ | −4.03 |
| $\varepsilon_\perp$ | 7.67 |
| $\eta$/mPa·s | 24.3 |
| $\gamma_1$/mPa·s | 164 |
| $\gamma_1/\Delta n^2 \times 10^{-3}$ | 15.5 |
| $\gamma_1/\Delta n^2/|\Delta\varepsilon|$ | 3.84 |

The liquid crystal composition 11 is found to have $T_{NI}$ which is practical for liquid crystal compositions for TVs, a high absolute value of $\Delta\varepsilon$, low $\eta$, and appropriate $\Delta n$. An FFS mode liquid crystal display device was produced using the liquid crystal composition 11 and the image sticking, the drop mark, the process compatibility, and the solubility at low temperature were evaluated by the above-described methods. The evaluation results were excellent.

Example 12

Liquid Crystal Composition 12

A liquid crystal composition (liquid crystal composition 12) having a composition below and designed so as to have the same $T_{NI}$, $\Delta n$, and $\Delta \epsilon$ as those of the liquid crystal compositions 7 to 11 was prepared, and the physical properties were measured. The results are shown in Table 14.

TABLE 14

| Example 12 | |
| --- | --- |
| 3CyCy2 | 24% |
| 3CyCy4 | 5% |
| 3CyCyPh1 | 9% |
| 3CyPh5O2 | 10% |
| 5CyPh5O2 | 3% |
| 3PhPh5O2 | 8% |
| 3CyCyPh5O2 | 10% |
| 4CyCyPh5O2 | 9% |
| 2CyPhPh5O2 | 11% |
| 3CyPhPh5O2 | 11% |
| $T_{NI}/°C.$ | 86.0 |
| $\Delta n$ | 0.103 |
| $n_o$ | 1.484 |
| $\Delta \epsilon$ | −4.03 |
| $\epsilon_\perp$ | 7.69 |
| $\eta/mPa \cdot s$ | 22.5 |
| $\gamma_1/mPa \cdot s$ | 145 |
| $\gamma_1/\Delta n^2 \times 10^{-3}$ | 13.7 |
| $\gamma_1/\Delta n^2/|\Delta \epsilon|$ | 3.39 |

The liquid crystal composition 12 is found to have $T_{NI}$ which is practical for liquid crystal compositions for TVs, a high absolute value of $\Delta \epsilon$, low $\eta$, and appropriate $\Delta n$. An FFS mode liquid crystal display device was produced using the liquid crystal composition 12 and the image sticking, the drop mark, the process compatibility, and the solubility at low temperature were evaluated by the above-described methods. The evaluation results were excellent.

Example 13

Liquid Crystal Composition 13

A liquid crystal composition (liquid crystal composition 13) having a composition below and designed so as to have the same $T_{NI}$, $\Delta n$, and $\Delta \epsilon$ as those of the liquid crystal compositions 7 to 12 was prepared, and the physical properties were measured. The results are shown in Table 15.

TABLE 15

| Example 13 | |
| --- | --- |
| 3CyCyV | 20% |
| 3CyCyV1 | 10% |
| 3CyCyPh1 | 7% |
| 3CyPhPh2 | 3% |
| 3CyPh5O2 | 13% |
| 5CyPh5O2 | 12% |
| 3CyCyPh5O2 | 10% |
| 4CyCyPh5O2 | 5% |
| 2CyPhPh5O2 | 10% |
| 3CyPhPh5O2 | 10% |
| $T_{NI}/°C.$ | 85.8 |
| $\Delta n$ | 0.103 |
| $n_o$ | 1.482 |

TABLE 15-continued

| Example 13 | |
| --- | --- |
| $\Delta \epsilon$ | −4.02 |
| $\epsilon_\perp$ | 7.82 |
| $\eta/mPa \cdot s$ | 20.9 |
| $\gamma_1/mPa \cdot s$ | 123 |
| $\gamma_1/\Delta n^2 \times 10^{-3}$ | 11.6 |
| $\gamma_1/\Delta n^2/|\Delta \epsilon|$ | 2.88 |

The liquid crystal composition 13 is found to have $T_{NI}$ which is practical for liquid crystal compositions for TVs, a high absolute value of $\Delta \epsilon$, low $\eta$, and appropriate $\Delta n$. The same FFS mode liquid crystal display device as in Example 1 was produced using the liquid crystal composition 13 and the image sticking, the drop mark, the process compatibility, and the solubility at low temperature were evaluated by the above-described methods. The evaluation results were excellent.

Example 14

Liquid Crystal Composition 14

A liquid crystal composition (liquid crystal composition 14) having a composition below and designed so as to have the same $T_{NI}$, $\Delta n$, and $\Delta \epsilon$ as those of the liquid crystal compositions 7 to 13 was prepared, and the physical properties were measured. The results are shown in Table 16.

TABLE 16

| Example 14 | |
| --- | --- |
| 3CyCy2 | 22% |
| 3CyCy4 | 3% |
| 3CyCyPh1 | 7% |
| 3CyCyPh2 | 4% |
| 3CyPh5O2 | 13% |
| 5CyPh5O2 | 12% |
| 3CyCyPh5O2 | 9% |
| 4CyCyPh5O2 | 6% |
| 2CyPhPh5O2 | 12% |
| 3CyPhPh5O2 | 12% |
| $T_{NI}/°C.$ | 85.0 |
| $\Delta n$ | 0.103 |
| $n_o$ | 1.483 |
| $\Delta \epsilon$ | −4.04 |
| $\epsilon_\perp$ | 7.88 |
| $\eta/mPa \cdot s$ | 24.3 |
| $\gamma_1/mPa \cdot s$ | 152 |
| $\gamma_1/\Delta n^2 \times 10^{-3}$ | 14.3 |
| $\gamma_1/\Delta n^2/|\Delta \epsilon|$ | 3.55 |

The liquid crystal composition 14 is found to have $T_{NI}$ which is practical for liquid crystal compositions for TVs, a high absolute value of $\Delta \epsilon$, low $\eta$, and appropriate $\Delta n$. The same FFS mode liquid crystal display device as in Example 1 was produced using the liquid crystal composition 14 and the image sticking, the drop mark, the process compatibility, and the solubility at low temperature were evaluated by the above-described methods. The evaluation results were excellent.

REFERENCE SIGNS LIST

1,8 polarizing plate
2 first substrate
3 electrode layer
4 alignment film
5 liquid crystal layer
6 color filter
7 second substrate 11 gate electrode
12 gate insulating layer
13 semiconductor layer
14 insulating layer
15 ohmic contact layer
16 drain electrode
17 source electrode
18 insulating protective layer
21 pixel electrode
22 common electrode
23 storage capacitor
25 data bus line
27 source bus line
29 common line

The invention claimed is:

1. An FFS mode liquid crystal display device comprising a first transparent insulating substrate and a second transparent insulating substrate disposed so as to face each other; a liquid crystal layer containing a liquid crystal composition and sandwiched between the first transparent insulating substrate and the second transparent insulating substrate;
   a common electrode composed of a transparent conductive material and disposed on the first transparent insulating substrate; a plurality of gate bus lines and a plurality of data bus lines disposed on the first transparent insulating substrate so as to form a matrix;
   a thin film transistor disposed at each of intersections of the gate bus lines and the data bus lines; a pixel electrode composed of a transparent conductive material and driven by the transistor, the thin film transistor and the pixel electrode being included in each pixel; and
   alignment films that induce homogeneous alignment and are disposed between the liquid crystal layer and the first transparent insulating substrate and between the liquid crystal layer and the second transparent insulating substrate, alignment directions of the alignment films being parallel to each other,
   wherein an interelectrode distance R between the pixel electrode and the common electrode is smaller than a distance G between the first transparent insulating substrate and the second transparent insulating substrate so that a fringing field is formed between the pixel electrode and the common electrode, wherein the interelectrode distance (R) being 0,
   the common electrode is disposed on substantially an entire surface of the first transparent insulating substrate so as to be closer to the first transparent insulating substrate than the pixel electrode, and
   the liquid crystal composition has a negative dielectric anisotropy, a nematic phase-isotropic liquid phase transition temperature of 60° C. or higher, and an absolute value of dielectric anisotropy of 2 or more, the liquid crystal composition having a refractive index anisotropy Δn of 0.10 or more, and
   the liquid crystal composition comprises: at least one compound selected from the group of compounds represented by general formula (I), at least one compound selected from the group of compounds represented by general formula (II); and one or more of compounds represented by general formula (IV),

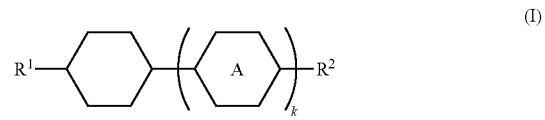

wherein in the general formula (I), $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; A represents a 1,4-phenylene group or a trans-1,4-cyclohexylene group; k represents 1 or 2; and when k represents 2, two A may be the same or different),

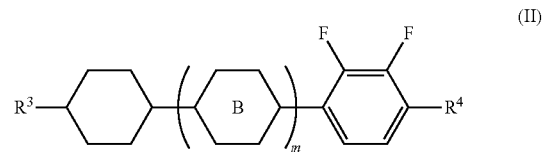

wherein in the general formula (II), $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; B represents a 1,4-phenylene group or a trans-1,4-cyclohexylene group; m represents 0, 1, or 2; and when m represents 2, two B may be the same or different,

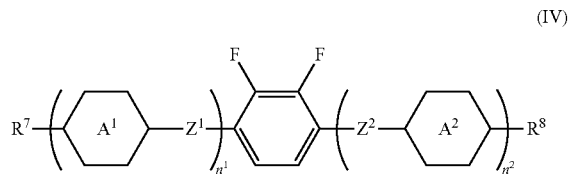

wherein the general formula (IV), $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; one or more hydrogen atoms in the alkyl group, the alkenyl group, the alkoxy group, or the alkenyloxy group may be substituted with fluorine atoms; a methylene group in the alkyl group, the alkenyl group, the alkoxy group, or the alkenyloxy group may be substituted with an oxygen atom as long as oxygen atoms do not directly bond to each other and may be substituted with a carbonyl group as long as carbonyl groups do not directly bond to each other;
$A^1$ and $A^2$ each independently represent a 1,4-cyclohexylene group, a 1,4-phenylene group, or a tetrahydropyran-2,5-diyl group; when $A^1$ and/or $A^2$ represents a 1,4-phenylene group, one or more hydrogen atoms in the 1,4-phenylene group may be substituted with fluorine atoms;

$Z^1$ and $Z^2$ each independently represent a single bond, —OCH$_2$—, —OCF$_2$—, —CH$_2$O—, or CF$_2$O-;

$n^1$ and $n^2$ each independently represent 0, 1, 2, or 3 and $n^1+n^2$ is 1 to 3; when a plurality of $A^1$, $A^2$, $Z^1$, and/or $Z^2$ are present, $A^1$, $A^2$, $Z^1$, and/or $Z^2$ may be the same or different, wherein the general formula (IV) excludes a compound in which $n^1$ represents 1 or 2, $n^2$ represents 0, $A^1$ represents a 1,4-cyclohexylene group, and all $Z^1$ represent single bonds, wherein the total content of the compounds represented by the general formula (I), the general formula (II), and the general formula (IV) in the liquid crystal composition is 80 to 100 mass %.

2. The liquid crystal display device according to claim 1, wherein the compounds represented by the general formula (I) include at least one compound selected from the group of compounds represented by general formula (III) below,

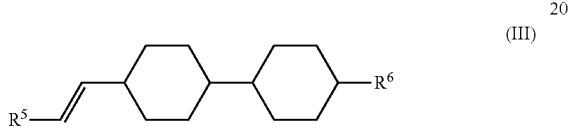

(III)

(in the formula, R$^5$ represents a hydrogen atom or a methyl group and R$^6$ represents an alkyl group having 1 to 5 carbon atoms, an alkenyl group having 2 to 5 carbon atoms, or an alkoxy group having 1 to 4 carbon atoms).

3. The liquid crystal composition according to Claim 1, wherein the compounds represented by the general formula (IV) include at least one compound selected from the group of compounds represented by general formula (IVa1) and general formula (IVa2) below,

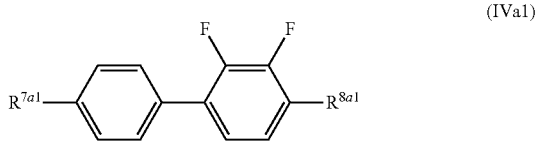

(IVa1)

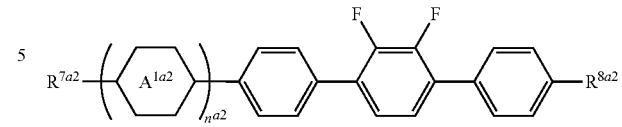

(IVa2)

(in the formula, R$^{7a1}$, R$^{7a2}$, R$^{8a1}$, and R$^{8a2}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; one or more hydrogen atoms in the alkyl group, the alkenyl group, the alkoxy group, or the alkenyloxy group may be substituted with fluorine atoms; a methylene group in the alkyl group, the alkenyl group, the alkoxy group, or the alkenyloxy group may be substituted with an oxygen atom as long as oxygen atoms do not directly bond to each other and may be substituted with a carbonyl group as long as carbonyl groups do not directly bond to each other;

$n^{a2}$ represents 0 or 1; $A^{1a2}$ represents a 1,4-cyclohexylene group, a 1,4-phenylene group, or a tetrahydropyran-2,5-diyl group; and one or more hydrogen atoms in the 1,4-phenylene group in the general formula (IVa1) and the general formula (IVa2) may be substituted with fluorine atoms).

4. The liquid crystal display device according to claim 1, wherein the pixel electrode is a comb-shaped pixel electrode or a pixel electrode having a slit.

5. The liquid crystal display device according to claim 1, wherein the total content of the compounds represented by the general formula (I), the general formula (II), and the general formula (IV) in the liquid crystal composition is 90 to 100 mass %.

6. The liquid crystal display device according to claim 1, wherein the liquid crystal composition has a refractive index anisotropy Δn of 0.10 to 0.12.

* * * * *